[12] United States Patent
Amicangioli et al.

(10) Patent No.: US 11,683,199 B2
(45) Date of Patent: Jun. 20, 2023

(54) DISTRIBUTED SYSTEM WITH FAULT TOLERANCE AND SELF-MAINTENANCE

(71) Applicant: Hyannis Port Research, Inc., Needham, MA (US)

(72) Inventors: Anthony D. Amicangioli, Newton, MA (US); Allen Bast, Sharon, MA (US); Christophe Juhasz, Carlisle, MA (US)

(73) Assignee: Hyannis Port Research, Inc., Needham, MA (US)

( * ) Notice: Subject to any disclaimer, the term of this patent is extended or adjusted under 35 U.S.C. 154(b) by 357 days.

(21) Appl. No.: 16/988,464

(22) Filed: Aug. 7, 2020

(65) Prior Publication Data
US 2022/0045878 A1 Feb. 10, 2022

(51) Int. Cl.
*H04L 12/26* (2006.01)
*H04L 12/417* (2006.01)
*H04L 45/24* (2022.01)
*G06Q 40/04* (2012.01)

(52) U.S. Cl.
CPC ........... *H04L 12/417* (2013.01); *G06Q 40/04* (2013.01); *H04L 45/24* (2013.01)

(58) Field of Classification Search
None
See application file for complete search history.

(56) References Cited

U.S. PATENT DOCUMENTS

| 6,697,331 | B1 | 2/2004 | Riihinen et al. |
| 6,996,062 | B1 | 2/2006 | Freed et al. |
| 7,023,833 | B1 | 4/2006 | Aiello et al. |
| 7,496,086 | B2 | 2/2009 | Eckberg et al. |
| 7,720,043 | B2 | 5/2010 | Meylan et al. |
| 7,876,740 | B2 | 1/2011 | Eastwood et al. |
| 7,876,751 | B2 | 1/2011 | Benner et al. |

(Continued)

FOREIGN PATENT DOCUMENTS

| EP | 1968275 A1 | 9/2008 |
| EP | 3438830 A1 | 2/2019 |

(Continued)

OTHER PUBLICATIONS

International Search Report and Written Opinion received for PCT Patent Application No. PCT/US2021/044746, dated Dec. 23, 2021, 14 pages.

(Continued)

*Primary Examiner* — Zewdu A Beyen
(74) *Attorney, Agent, or Firm* — Hamilton, Brook, Smith & Reynolds, P.C.

(57) ABSTRACT

A distributed system includes a plurality of compute nodes configured to process messages. The compute nodes each process messages corresponding an assigned value of a common parameter of the messages. The values are assigned to the compute nodes such that two or more compute nodes are available to process each message. The values can be assigned to the compute nodes in a grouping configuration or a striping configuration. The compute nodes also circulate one or more tokens among nodes, and perform a self-maintenance operation during a given state of possession of the token. During a self-maintenance operation, the values assigned to the compute node can be reassigned to other compute nodes to ensure processing of corresponding messages.

26 Claims, 15 Drawing Sheets

(56) References Cited

U.S. PATENT DOCUMENTS

| | | |
|---|---|---|
| 7,885,296 B2 | 2/2011 | Biederman et al. |
| 7,948,883 B1 | 5/2011 | Croft et al. |
| 8,923,341 B2 | 12/2014 | Barnette et al. |
| 9,691,102 B2 | 6/2017 | Studnitzer et al. |
| 9,712,606 B2 | 7/2017 | Färnlöf et al. |
| 9,929,743 B1 | 3/2018 | Acuna-Rohter et al. |
| 10,104,148 B2 | 10/2018 | Yang et al. |
| 10,262,365 B2 | 4/2019 | Venkataraman |
| 10,417,709 B2 | 9/2019 | Hosman et al. |
| 10,467,693 B2 | 11/2019 | Studnitzer et al. |
| 10,504,183 B2 | 12/2019 | Venkataraman |
| 10,585,729 B2 | 3/2020 | Vaccaro et al. |
| 10,637,967 B2 | 4/2020 | Bonig |
| 10,699,336 B2 | 6/2020 | Burkhardt et al. |
| 11,088,959 B1 | 8/2021 | Amicangioli et al. |
| 11,228,529 B1 | 1/2022 | Amicangioli et al. |
| 11,315,183 B2 | 4/2022 | Amicangioli et al. |
| 11,328,357 B2 | 5/2022 | Amicangioli et al. |
| 2003/0065974 A1 | 4/2003 | Lam |
| 2003/0235209 A1 | 12/2003 | Garg et al. |
| 2004/0215753 A1 | 10/2004 | Chan et al. |
| 2004/0246897 A1 | 12/2004 | Ma et al. |
| 2007/0255855 A1 | 11/2007 | Knapp et al. |
| 2008/0069118 A1 | 3/2008 | Monier |
| 2008/0084833 A1 | 4/2008 | Picard |
| 2010/0046368 A1 | 2/2010 | Kaempfer et al. |
| 2010/0318673 A1 | 12/2010 | Kemp et al. |
| 2011/0194409 A1 | 8/2011 | Ofelt et al. |
| 2011/0264577 A1 | 10/2011 | Winbom |
| 2012/0044940 A1 | 2/2012 | Katz et al. |
| 2012/0093022 A1 | 4/2012 | Wang |
| 2012/0131221 A1 | 5/2012 | Foygel et al. |
| 2012/0195203 A1 | 8/2012 | Godbole et al. |
| 2012/0317011 A1 | 12/2012 | Duquette |
| 2015/0078376 A1 | 3/2015 | Wisehart |
| 2015/0081508 A1 | 3/2015 | Schwall et al. |
| 2015/0195202 A1 | 7/2015 | Ogura |
| 2015/0341422 A1 | 11/2015 | Farnlof |
| 2015/0356679 A1 | 12/2015 | Schmitt |
| 2016/0028637 A1 | 1/2016 | Vasseur et al. |
| 2016/0063628 A1 | 3/2016 | Kreider et al. |
| 2016/0119080 A1 | 4/2016 | Gineste |
| 2016/0294921 A1 | 10/2016 | Meng |
| 2017/0127341 A1 | 5/2017 | Di Marco |
| 2017/0236203 A1 | 8/2017 | Amicangioli |
| 2018/0047099 A1 | 2/2018 | Bonig et al. |
| 2018/0167492 A1 | 6/2018 | Bonig |
| 2018/0279934 A1 | 10/2018 | Wo |
| 2018/0317121 A1 | 11/2018 | Liao et al. |
| 2018/0359195 A1 | 12/2018 | Shah et al. |
| 2019/0097745 A1 | 3/2019 | Mallela et al. |
| 2019/0222442 A1 | 7/2019 | Wei |
| 2019/0259099 A1 | 8/2019 | Katsuyama et al. |
| 2019/0349309 A1 | 11/2019 | Bonig |
| 2019/0379768 A1 | 12/2019 | Amicangioli et al. |
| 2020/0034929 A1* | 1/2020 | Rao ............... H04L 65/102 |
| 2020/0104269 A1 | 4/2020 | Pope et al. |
| 2020/0134720 A1 | 4/2020 | Katsuyama |
| 2020/0167865 A1 | 5/2020 | Craig |
| 2020/0169355 A1 | 5/2020 | McIlroy |
| 2020/0187274 A1 | 6/2020 | Rune et al. |
| 2022/0044318 A1 | 2/2022 | Amicangioli et al. |
| 2022/0044319 A1 | 2/2022 | Amicangioli et al. |
| 2022/0045955 A1 | 2/2022 | Amicangioli et al. |
| 2022/0045964 A1 | 2/2022 | Amicangioli et al. |

FOREIGN PATENT DOCUMENTS

| | | |
|---|---|---|
| JP | 2019050013 A | 3/2019 |
| WO | 2008/142705 A2 | 11/2008 |
| WO | 2012144999 A2 | 10/2012 |
| WO | 2018106350 A1 | 6/2018 |
| WO | 2018/183542 A1 | 10/2018 |
| WO | 2022/031878 A1 | 2/2022 |
| WO | 2022/031880 A1 | 2/2022 |
| WO | 2022/031970 A1 | 2/2022 |
| WO | 2022/031971 A1 | 2/2022 |
| WO | 2022/031975 A1 | 2/2022 |

OTHER PUBLICATIONS

"Determinism is the new latency," Arista.com, Solution Brief (Jan. 23, 2019).

"ICON® Deterministic Packet Transport," SEL Schweitzer Engineering Laboratories (2016).

https://tools.ietf.org/html/draft-geng-detnet-requirements-bounded-latency-03; "Requirements of Layer 3 Deterministic Latency Service draft-geng-detnet-requirements-bounded-latency-03," (Mar. 4, 2020).

"Configuring Queuing and Flow Control," Cisco Nexus 5000 Series NX-OS Quality of Service Configuration Guide, Release 5.2(1)N1(1) (Jan. 26, 2018).

Qiu et al., "Hierarchy Virtual Queue Based Flow Control in LTE/SAE," 2010 Second International Conference on Future Networks, pp. 78-82 (2010).

Zou, J., et al., "Design and Analysis of a Distributed Multi-leg Stock Trading System," 31st International Conference on Distributed Computing Systems, IEEE Computer Society, Jun. 20-24, 2011, pp. 13-24.

* cited by examiner

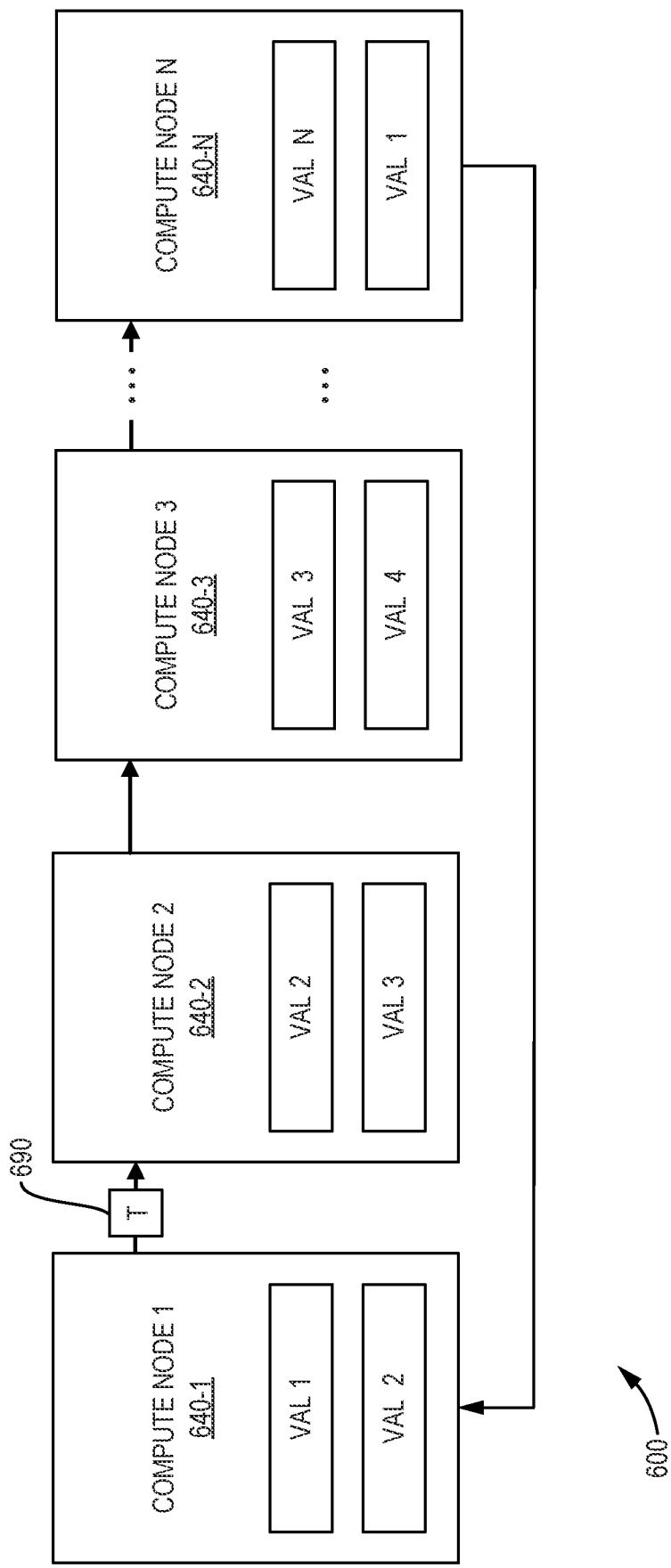

DISTRIBUTED SYSTEM WITH FAULT TOLERANCE AND SELF-MAINTENANCE

BACKGROUND

Typical electronic trading systems performing order matching use a traditional networked architecture, in which multiple computing hosts communicate with one another over a shared network through one or more networking devices such as switches or routers. A number of gateway hosts operate as interfaces between client trader devices operating on the front end and a network of matching engines operating on the back end. The gateway nodes, matching engine, and sequencer nodes all communicate over the same shared matching engine network through the switches or routers.

In the era of low latency trading, in which microseconds or even nanoseconds are consequential, market participants sending trades over electronic trading systems are very sensitive to latency, preferring low, predictable latency. The need to share a computing network and traverse through shared networking devices can increase the average latency, and may also result in unpredictable spikes in latency during heavier trading periods.

SUMMARY

In a distributed computing environment, there is often a need to perform maintenance on one or more nodes. For example, in a computing node using software running in a Java runtime environment, periodic garbage collection may be necessary to clean up unused host memory that had been dynamically allocated. However, a maintenance operation may severely degrade performance of a node or even render the node inoperable during the maintenance operation. This resulting performance degradation could be of significant concern in distributed computing environments that are sensitive to latency. In addition, a node that is effectively inoperable during its maintenance operation can risk reducing the overall availability, perhaps even causing a temporary outage, of an application running in the distributed computing environment.

Example embodiments described herein provide computing infrastructure for fault-tolerant maintenance of computing nodes. In one example, a distributed system implements fault-tolerant groupings of nodes (e.g., pairs, triplets, quartets), in which each node of the grouping is redundant with respect to other nodes in the grouping. Computing tasks within the computing environment may be partitioned off by grouping such that any node in the grouping can perform the task partitioned off to that grouping. For example, in a financial market engine, individual stock symbols may be assigned to be serviced by a particular pair of nodes, such that a message referencing a particular stock symbol can be sent to either or both nodes in that pair. Other allocation configurations may be implemented, including partitioning by type of message (e.g., a new order, a fill order, a replace order). This grouping of redundant nodes provides a fault tolerance within the distributed system and reduces the chance that a maintenance operation will impact the performance or availability of the distributed system.

Further embodiments may also manage maintenance operations at the nodes, thereby ensuring that a node is always available to process a given message. In one example, one or more "tokens" may be passed among the nodes, and possession of the token may grant permission to a node to perform a maintenance operation. Upon receiving the token, a node may perform maintenance if needed, and upon completion of the maintenance, the node may pass the token to the next node to provide the next node the opportunity to perform maintenance. Example embodiments may implement a single token for all computing nodes in the system, or may provide each redundant group with a respective token. As a result, the distributed system can operate without any degradation of latency or risk of unavailability of the nodes.

Example embodiments may therefore include a computing-based distributed system with self-maintenance. The distributed system may comprise a plurality of compute nodes configured to process messages, each of the messages corresponding to one of a plurality of values of a common parameter of the messages. The plurality of compute nodes may be configured to 1) circulate at least one token between or among at least two of the plurality of respective compute nodes, and 2) perform a self-maintenance operation during a given state of possession of the token.

The plurality of compute nodes may include a first subset of at least two of the plurality of compute nodes, the first subset being configured to process messages corresponding to a first value of the common parameter of the messages. A second subset of at least two of the plurality of compute nodes may be distinct from the first subset, and may be configured to process messages corresponding to a second value of the common parameter of the messages and to refrain from processing messages corresponding to the first value. Each of the compute nodes of the first subset may be configured to process a message corresponding to the first value in parallel and independent from one another. During the self-maintenance operation by one of the compute nodes of the first subset, at least one other compute node of the first subset may be configured to process a message corresponding to the first value. The plurality of compute nodes may be further configured to circulate the at least one token between or among the first and second subsets. The first subset may also be configured to circulate a first one of the at least one token between or among the plurality of compute nodes of the first subset, and the second subset may be configured to circulate a second one of the at least one token among the second subset.

In a further embodiment, each of the plurality of values of the common parameter may be distributed among the compute nodes in a "striping" configuration, wherein the values are assigned to at least two of the plurality of compute nodes, and each of the plurality of compute nodes may be assigned to process a respective subset of at least two of the plurality of values of the common parameter. Further, each of the respective subsets may differ from one another by at least one value of the common parameter. Each of plurality of compute nodes assigned to a given value of the common parameter may be configured to process a message corresponding to the given value in parallel and independent from one another. During a self-maintenance operation by a first compute node assigned to a first value of the common parameter, a second compute node may be assigned to process messages corresponding to a first value in addition to the respective subset.

Each compute node of the plurality of compute nodes may be configured to refrain from performing the self-maintenance operation when not in the given state of possession of the at least one token. Each compute node of the plurality of compute nodes may be configured to 1) receive the at least one token from a preceding one of the plurality of compute nodes; 2) perform the self-maintenance operation selectively based on a state of the compute node; and 3) forward the at least one token to a subsequent one of the plurality of compute nodes. The messages may be associated with transactions of financial instruments, the respective values of the common parameter each corresponding to a respective financial instrument or a transaction type.

The distributed system may further comprise at least one gateway configured to forward the messages to the plurality of compute nodes, as well as at least one sequencer configured to sequence the messages. The plurality of compute nodes may be further configured to forward a response to the at least one gateway after processing a message. The at least one gateway may be further configured to transmit a message corresponding to a subset of the plurality of compute nodes as a function of a first value of a common parameter of the message.

The self-maintenance operation may include at least one of 1) clearing data associated with at least one previous message processing operation, 2) moving data in memory, 3) adjusting layout of a memory, and 4) modifying a message queue. Further, the at least one token may include a plurality of tokens, each of the plurality of tokens indicating a respective type of self-maintenance operation. The self-maintenance operation may correspond to the respective type.

Further embodiments may include a distributed system for processing computing tasks, the distributed system comprising a plurality of compute nodes including at least a first, second and third compute node. The first compute node may be configured to process messages corresponding to a first value and a second value of a common parameter of the messages. The second compute node may be configured to process messages corresponding to the second value and a third value of a common parameter of the messages and refrain from processing messages corresponding to the first value. The third compute node may be configured to process messages corresponding to the third value and a fourth value of the common parameter of the messages and refrain from processing messages corresponding to the second value. The compute nodes may also be configured to circulate at least one token between or among at least some of the plurality of compute nodes, and perform a self-maintenance operation during a given state of possession of the token.

Each of the first compute node and the second compute node may be configured to process a message corresponding to the second value in parallel and independent from one another. During a self-maintenance operation by the first compute node, the second compute node may be configured to process the message corresponding to the second value. The compute nodes may also circulate the at least one token among the first, second and third compute nodes. Each of the plurality of compute nodes may be configured to refrain from performing the self-maintenance operation when not in the given state of possession of the at least one token.

Each of the compute nodes may be configured to receive the at least one token from a preceding one of the plurality of compute nodes, perform the self-maintenance operation selectively based on a state of the compute node, and then forward the at least one token to a subsequent one of the plurality of compute nodes. The messages may be associated with transactions of financial instruments, and the first, second, third and fourth values may each correspond to a respective financial instrument or a transaction type. A plurality of values may include the first, second, third and fourth values, and each of the plurality of values may be assigned to a subset of at least two of the plurality of compute nodes. In response to an indication that the first compute node is not operational, at least one of the plurality of compute nodes may be reconfigured to process messages corresponding to at least one of the first value and the second value.

Further embodiments include a method of processing messages. At a plurality of compute nodes, messages may be selectively processed based on a value of a common parameter of the messages. At least one token may be circulated between or among at least two of the plurality of respective compute nodes. At the plurality of compute nodes, a self-maintenance operation may be performed during a given state of possession of the token.

Still further embodiments include a method of processing messages at a first compute node. A first message may be parsed to determine a value of a common parameter of the message. The message may be processed selectively based on whether the value corresponds to an assigned common parameter associated with the compute node. A token may be received from a second compute node. A self-maintenance operation may then be performed during a given state of possession of the token. The token may then be sent to the second compute node or a third compute node.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 6 is a block diagram illustrating an arrangement of compute nodes in a further embodiment.

DETAILED DESCRIPTION

A description of example embodiments follows.

Example embodiments disclosed herein relate to a high-speed electronic trading system that provides a market where orders to buy and sell financial instruments (such as stocks, bonds, commodities, futures, options, and the like) are traded among market participants (such as traders and brokers). The electronic trading system exhibits low latency, fairness, fault tolerance, and other features more fully described below.

The electronic trading system is primarily responsible for "matching" orders to one another. In one example, an offer to "buy" an instrument is matched to a corresponding counteroffer to "sell". The matched offer and counteroffer must at least partially satisfy the desired price, with any residual unsatisfied quantity passed to another suitable counterorder. Matched orders are then paired and the trade is executed.

Any wholly unsatisfied or partially satisfied orders are maintained in a data structure referred to as an "order book". The retained information regarding unmatched orders can be used by the matching engine to satisfy subsequent orders. An order book is typically maintained for each instrument and generally defines or otherwise represents the state of the market for that particular product. It may include, for example, the recent prices and quantities at which market participants have expressed a willingness to buy or sell.

The results of matching may also be made visible to market participants via streaming data services referred to as market data feeds. A market data feed typically includes individual messages that carry the pricing for each traded instrument, and related information such as volume and other statistics.

Figure 1:
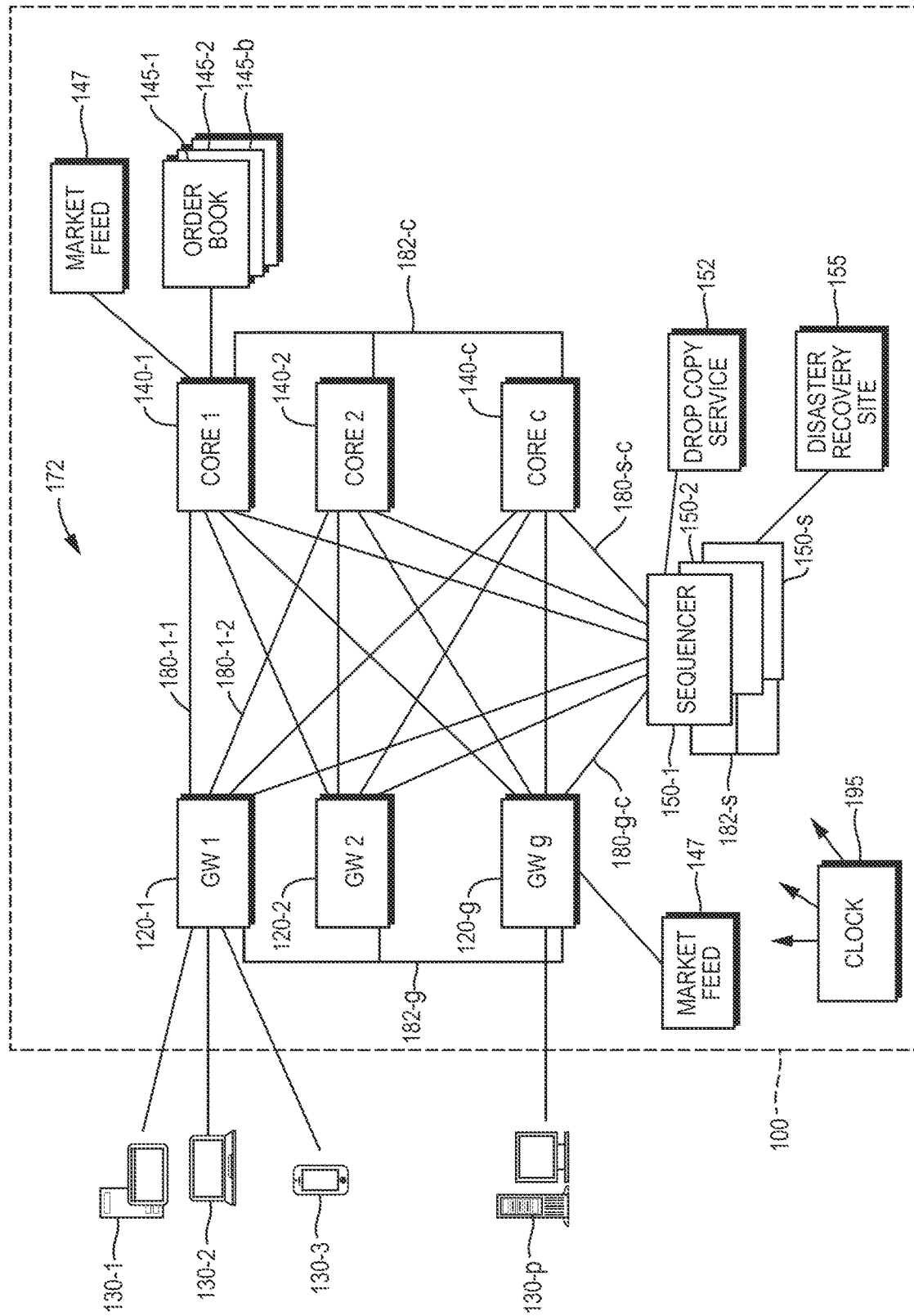
FIG. 1 is a block diagram of an electronic trading system in which example embodiments may be implemented.

FIG. 1 illustrates an example electronic trading system 100 that includes a number of gateways 120-1, 120-2, ..., 120-g (collectively referred to as gateways 120), a set of core compute nodes 140-1, 140-2, ..., 140-c (collectively, the core compute nodes 140 or compute nodes 140), and one or more sequencers 150-1, 150-2, ..., 150-s (collectively, the sequencers 150). In some embodiments, the gateways 120, core compute nodes 140, and sequencers 150 are thus considered to be nodes in electronic trading system 100. As will be described in more detail below, in one embodiment, the gateways 120, compute nodes 140 and sequencers 150 are directly connected to one another, preferably via low latency, dedicated connections 180.

The term "peer" in relation to the discussion of the system 100 refers to another device that generally serves the same function (e.g., "gateway" vs. "core compute node" vs. "sequencer") in electronic trading system 100. For example, gateways 120-2, ..., 120-g are the peers for gateway 120-1, core compute nodes 140-2, ..., 140-c are the peers for core compute node 140-1, and sequencers 150-2, ..., 150-s are the peers for sequencer 150-1.

The electronic trading system 100 processes orders from and provides related information to one or more participant computing devices 130-1, 130-2, ..., 130-p (collectively, the participant devices 130). Participant devices 130 interact with the system 100, and may be one or more personal computers, tablets, smartphones, servers, or other data processing devices configured to display and receive trade order information. The participant devices 130 may be operated by a human via a graphical user interface (GUI), or they may be operated via high-speed automated trading methods running on some physical or virtual data processing platform.

Each participant device 130 may exchange messages with (that is, send messages to and receive messages from) the electronic trading system 100 via connections established with a gateway 120. While FIG. 1 illustrates each participant device 130 as being connected to electronic trading system 100 via a single connection to a gateway 120, it should be understood that a participant device 130 may be connected to electronic trading system 100 over multiple connections to one or more gateway devices 120.

Note that, while each gateway 120-1 may serve a single participant device 130, it typically serves multiple participant devices 130.

The compute nodes 140-1, 140-2, ..., 140-n (also referred to herein as matching engines 140 or compute engines 140) provide the matching functions described above and may also generate outgoing messages to be delivered to one or more participant devices 130. Each compute node 140 is a high-performance data processor and typically maintains one or more data structures to search and maintain one or more order books 145-1, ..., 145-b. An order book 145-1 may be maintained, for example, for each instrument for which the core compute node 140-1 is responsible. One or more of the compute nodes 140 and/or one or more of the gateways 120 may also provide market data feeds 147. Market data feeds 147 may be broadcast (for example, multicast), to subscribers, which may be participant devices 130 or any other suitable computing devices.

Some outgoing messages generated by core compute nodes 140 may be synchronous, that is, generated directly by a core compute node 140 in response to one or more incoming messages received from one or more participant devices 130, such as an outgoing "acknowledgement message" or "execution message" in response to a corresponding incoming "new order" message. In some embodiments, however, at least some outgoing messages may be asynchronous, initiated by the trading system 100, for example, certain "unsolicited" cancel messages and "trade break" or "trade bust" messages.

Distributed computing environments, such as the electronic trading system 100, can be configured with multiple matching engines operating in parallel on multiple compute nodes 140.

The sequencers 150 ensure that the proper sequence of any order-dependent operations is maintained. To ensure that operations on incoming messages are not performed out of order, incoming messages received at one or more gateways 120, for example, a new trade order message from one of participant devices 130, typically must then pass through at least one sequencer 150 in which they are marked with a sequence identifier. That identifier may be a unique, monotonically increasing value which is used in the course of subsequent processing throughout the distributed system 100 (e.g., electronic trading system 100) to determine the relative ordering among messages and to uniquely identify messages throughout electronic trading system 100. It should be understood, however, that while unique, the identifier is not limited to a monotonically increasing or decreasing value. Once sequenced, the marked incoming messages, that is the sequence-marked messages, are typically then forwarded by sequencer(s) 150 to other downstream compute nodes 140 to perform potentially order-dependent processing on the messages.

In some embodiments, messages may also flow in the other direction, that is, from a core compute node 140 to one or more of the participant devices 130, passing through one or more of the gateways 120. Such outgoing messages generated by a core compute node 140 may also be order-dependent, and accordingly may also typically first pass through a sequencer 150 to be marked with a sequence identifier. The sequencer 150 may then forward the marked response message to the gateways 120 in order to pass on to participant devices 130 in a properly deterministic order.

The use of a sequencer 150 to generate unique sequence numbers ensures the correct ordering of operations is maintained throughout the distributed system 100, regardless of which compute node or set of compute nodes 140 processes the messages. This approach provides "state determinism," to provide fault-tolerance, high availability and disaster recoverability.

It may also be important for a generating node (i.e., a node introducing a new message into the electronic trading system 100, for example by generating a new message and/or by forwarding a message received from a participant device 130) and its peer nodes to receive the sequence number assigned to that message. Receiving the sequence number for a message it generated may be useful to the generating node and its peer nodes not only for processing messages in order according to their sequence numbers, but also to correlate the message generated by the node with the message's identifier that is used throughout the rest of the electronic trading system 100. A subsequent message generated within the electronic trading system 100, while also being assigned its own sequence number, may yet reference one or more sequence numbers of related preceding messages. Accordingly, a node may need to quickly reference (by sequence number) a message the node had itself previously generated, because, for example, the sequence number of the message the node had generated was referenced in a subsequent message.

In some embodiments, the generating node may first send a message to the sequencer 150 and wait to receive the sequence number from the sequencer before the generating node forwards the message to other nodes in electronic trading system 100.

In alternate example embodiments, to avoid at least one hop, which could add undesirable increased latency within electronic trading system 100, after receiving the un-sequenced message from the generating node, sequencer 150 may not only send a sequenced version of the message (e.g., a sequence-marked message) to destination nodes, but may also send substantially simultaneously a sequenced version of the message back to the sending node and its peers. For example, after assigning a sequence number to an incoming message sent from the gateway 120-1 to core compute nodes 140, the sequencer 150 may not only forward the sequenced version of the message to the core compute nodes 140, but may also send a sequenced version of that message back to the gateway 120-1 and the other gateways 120. Accordingly, if any subsequent message generated in a core compute node 140 references that sequence number, any gateway 120 may easily identify the associated message originally generated by gateway 120-1 by its sequence number.

Similarly, in some further embodiments, a sequenced version of an outgoing message generated by and sent from a core compute node 140 to gateways 120, and sequenced by sequencer 150, may be forwarded by sequencer 150 both to gateways 120 and back to core compute nodes 140.

Some embodiments may include multiple sequencers 150 for high availability, for example, to ensure that another sequencer is available if the first sequencer fails. For embodiments with multiple sequencers 150 (e.g., a currently active sequencer 150-1, and one or more standby sequencers 150-2, . . . , 150-s), the currently active sequencer 150-1 may maintain a system state log (not shown) of all the messages that passed through sequencer 150-1, as well as the messages' associated sequence numbers. This system state log may be continuously or periodically transmitted to the standby sequencers to provide them with requisite system state to allow them to take over as an active sequencer, if necessary.

The system state log may also be continually or periodically replicated to one or more sequencers in a standby replica electronic trading system (not shown in detail) at a disaster recovery site 155, thereby allowing electronic trading to continue with the exact same state at the disaster recovery site 155, should the primary site of system 100 suffer catastrophic failure.

In some embodiments, the system state log may also be provided to a drop copy service 152, which may be implemented by one or more of the sequencers, and/or by one or more other nodes in the electronic trading system 100. The drop copy service 152 may provide a record of daily trading activity through electronic trading system 100 that may be delivered to regulatory authorities and/or clients, who may, for example be connected via participant devices 130. In alternate embodiments, the drop copy service 152 may be implemented on one or more gateways 120. Furthermore, in addition to or instead of referencing the system state log, the drop copy service 152 may provide the record of trading activity based on the contents of incoming and outgoing messages sent throughout electronic trading system 100. For example, in some embodiments, a gateway 120 implementing the drop copy service 152 may receive from the sequencer 150 (and/or from core compute nodes 140 and other gateways 120) all messages exchanged throughout the electronic trading system 100. A participant device 130 configured to receive the record of daily trading activity from the drop copy service 152 may not necessarily also be sending orders to and utilizing a matching function of electronic trading system 100.

Messages exchanged between participant devices 130 and gateways 120 may be according to any suitable protocol that may be used for financial trading (referred to for convenience as, "financial trading protocol"). For example, the messages may be exchanged according to custom protocols or established standard protocols, including both binary protocols (such as Nasdaq OUCH and NYSE UTP), and text-based protocols (such as NYSE FIX CCG). In some embodiments, the electronic trading system 100 may support exchanging messages simultaneously according to multiple financial trading protocols, including multiple protocols simultaneously on the same gateway 120. For example, participant devices 130-1, 130-2, and 130-3 may simultaneously have established trading connections and may be exchanging messages with gateway 120-1 according to Nasdaq Ouch, NYSE UTP, and NYSE FIX CCG, respectively.

Furthermore, in some embodiments, the gateways 120 may translate messages according to a financial trading protocol received from a participant device 130 into a normalized message format used for exchanging messages among nodes within the electronic trading system 100. The normalized trading format may be an existing protocol or may generally be of a different size and data format than that of any financial trading protocol used to exchange messages with participant devices 130. For example, the normalized trading format, when compared to a financial trading protocol of the original incoming message received at the gateway 120 from a participant 130, may include in some cases one or more additional fields or parameters, may omit one or more fields or parameters, and/or each field or parameter of a message in the normalized format may be of a different data type or size than the corresponding message received at gateway 120 from the participant device 130. Similarly, in the other direction, gateways 120 may translate outgoing messages generated in the normalized format by electronic trading system 100 into messages in the format of one or more financial trading protocols used by participant devices 130 to communicate with gateways 120.

In the era of high-speed trading, in which microseconds or even nanoseconds are consequential, participants 130 exchanging messages with the electronic trading system 100 are often very sensitive to latency, preferring low, predictable latency. The arrangement shown in FIG. 1 accommodates this requirement by providing a point-to-point mesh 172 architecture between at least each of the gateways 120 and each of the compute nodes 140. In some embodiments, each gateway 120 in the mesh 172 may have a dedicated high-speed direct connection 180 to the compute nodes 140 and the sequencers 150.

For example, dedicated connection 180-1-1 is provided between gateway 1 120-1 and core compute node 1 140-1, dedicated connection 180-1-2 between gateway 1 120-1 and compute node 2 140-2, and so on, with example connection 180-g-c provided between gateway 120-g and compute node 140-c, and example connection 180-s-c provided between sequencer 150 and core c 140-c.

It should be understood that each dedicated connection 180 in the mesh 172 is, in some embodiments, a point-to-point direct connection that does not utilize a shared switch. A dedicated or direct connection may be referred to interchangeably herein as a direct or dedicated "link" and is a direct connection between two end points that is dedicated (e.g., non-shared) for communication therebetween. Such a dedicated/direct link may be any suitable interconnect(s) or interface(s), such as disclosed further below, and is not limited to a network link, such as wired Ethernet network connection or other type of wired or wireless network link. The dedicated/direct connection/link may be referred to herein as an end-to-end path between the two end points. Such an end-to-end path may be a single connection/link or may include a series of connections/links; however, bandwidth of the dedicated/direct connection/link in its entirety, that is, from one end point to another end point, is non-shared and neither bandwidth nor latency of the dedicated/direct connection/link can be impacted by resource utilization of element(s) if so traversed. For example, the dedicated/direct connection/link may traverse one or more buffer(s) or other elements that are not bandwidth or latency impacting based on utilization thereof. The dedicated/direct connection/link would not, however, traverse a shared network switch as such a switch can impact bandwidth and/or latency due to its shared usage.

For example, in some embodiments, the dedicated connections 180 in the mesh 172 may be provided in a number of ways, such as a 10 Gigabit Ethernet (GigE), 25 GigE, 40 GigE, 100 GigE, InfiniBand, Peripheral Component Interconnect-Express (PCIe), RapidIO, Small Computer System Interface (SCSI), FireWire, Universal Serial Bus (USB), High Definition Multimedia Interface (HDMI), or custom serial or parallel busses.

Therefore, although the compute engines 140, gateways 120, sequencers 150 and other components may sometimes be referred to herein as "nodes", the use of terms such as "compute node" or "gateway node" or "sequencer node" or "mesh node" should not be interpreted to mean that particular components are necessarily connected using a network link, since other types of interconnects or interfaces are possible. Further, a "node," as disclosed herein, may be any suitable hardware, software, firmware component(s), or combination thereof, configured to perform the respective function(s) set forth for the node. As explained in more detail below, a node may be a programmed general purpose processor, but may also be a dedicated hardware device, such as a field programmable gate array (FPGA), application specific integrated circuit (ASIC), or other hardware device or group of devices, logic within a hardware device, printed circuit board (PCB), or other hardware component.

It should be understood that nodes disclosed herein may be separate elements or may be integrated together within a single element, such as within a single FPGA, ASIC, or other element configured to implement logic to perform the functions of such nodes as set forth herein. Further, a node may be an instantiation of software implementing logic executed by general purpose computer and/or any of the foregoing devices.

Conventional approaches to connecting components, such as the compute engines 140, gateways 120, and sequencers 150 through one or more shared switches, do not provide the lowest possible latency. These conventional approaches also result in unpredictable spikes in latency during periods of heavier message traffic.

In an example embodiment, dedicated connections 180 are also provided directly between each gateway 120 and each sequencer 150, and between each sequencer 150 and each core compute node 140. Furthermore, in some embodiments, dedicated connections 180 are provided among all the sequencers, so that an example sequencer 150-1 has a dedicated connection 180 to each other sequencer 150-2, . . . , 150-s. While not pictured in FIG. 1, in some embodiments, dedicated connections 180 may also be provided among all the gateways 120, so that each gateway 120-1 has a dedicated connection 180 to each other gateway 120-2, . . . , 120-g. Similarly, in some embodiments, dedicated connections 180 are also provided among all the compute nodes 140, so that an example core compute node 140-1 has a dedicated connection 180 to each other core compute node 140-2, . . . , 140-c.

It should also be understood that a dedicated connection 180 between two nodes (e.g., between any two nodes 120, 150, or 140) may in some embodiments be implemented as multiple redundant dedicated connections between those same two nodes, for increased redundancy and reliability. For example, the dedicated connection 180-1-1 between gateway 120-1 and core compute node 140-1 (e.g., Core 1) may actually be implemented as a pair of dedicated connections.

In addition, according to some embodiments, any message sent out by a node is sent out in parallel to all nodes directly connected to it in the point-to-point mesh 172. Each node in the mesh 172 may determine for itself, for example, based on the node's configuration, whether to take some action upon receipt of a message, or whether instead simply to ignore the message. In some embodiments, a node may never completely ignore a message; even if the node, due to its configuration, does not take substantial action upon receipt of a message, it may at least take minimal action, such as consuming any sequence number assigned to the message by the sequencer 150. That is, in such embodiments, the node may keep track of a last received sequence number to ensure that when the node takes more substantial action on a message, it does so in proper sequenced order.

For example, a message containing an order to "Sell 10 shares of Microsoft at $190.00" might originate from participant device 130-1, such as a trader's personal computer, and arrive at gateway 120-1 (i.e., GW 1). That message will be sent to all core compute nodes 140-1, 140-2, . . . , 140-c even though only core compute node 140-2 is currently performing matching for Microsoft orders. All other core compute nodes 140-1, 140-3, . . . , 140-c may upon receipt ignore the message or only take minimal action on the message. For example, the only action taken by 140-1, 140-3, . . . , 140-c may be to consume the sequence number assigned to the message by the sequencer 150-1. That message will also be sent to all of the sequencers 150-1, 150-2, . . . , 150-s even though a single sequencer (in this example, sequencer 150-1) is the currently active sequencer servicing the mesh. The other sequencers 150-2, . . . , 150-s also received the message to allow them the opportunity to take over as the currently active sequencer should sequencer 150-1 (the currently active sequencer) fail, or if the overall reliability of the electronic trading system 100 would increase by moving to a different active sequencer. One or more of the other sequencers (sequencer 150-2 for example) may also be responsible for relaying system state to the disaster recovery site 155. The disaster recovery site 155 may include a replica of electronic trading system 100 at another physical location, the replica comprising physical or virtual instantiations of some or all of the individual components of electronic trading system 100.

By sending each message out in parallel to all directly connected nodes, the system 100 reduces complexity and also facilitates redundancy and high availability. If all directly connected nodes receive all messages by default, multiple nodes can be configured to take action on the same message in a redundant fashion. Returning to the example above of the order to "Sell 10 shares of Microsoft at $190.00", in some embodiments, multiple core compute nodes 140 may simultaneously perform matching for Microsoft orders. For example, both core compute node 140-1 and core compute node 140-2 may simultaneously perform matching for Microsoft messages, and may each independently generate, after having received the incoming message of the "Sell" order, a response message such as an acknowledgement or execution message that each of core compute node 140-1 and core compute node 140-2 sends to the gateways 120 through the sequencer(s) 150 to be passed on to one or more participant devices 130.

Because of the strict ordering and state determinism assured by the sequencer(s) 150, it is possible to guarantee that each of the associated response messages independently generated by and sent from the core compute nodes 140-1 and 140-2 are substantially equivalent; accordingly, the architecture of electronic trading system 100 readily supports redundant processing of messages, which increases the availability and resiliency of the system. In such embodiments, gateways 120 may receive multiple associated outgoing messages from core compute nodes 140 for the same corresponding incoming message. Due to the fact that it can be guaranteed that these multiple associated response messages are equivalent, the gateways 120 may simply process only the first received outgoing message, ignoring subsequent associated outgoing messages corresponding to the same incoming message. In some embodiments, the "first" and "subsequent" messages may be identified by their associated sequence numbers, as such messages are sequence-marked messages. Allowing the gateways 120 to take action on the first of several associated response messages to reach them may therefore also improve the overall latency of the system.

Such a point-to-point mesh 172 architecture of system 100, besides supporting low, predictable latency and redundant processing of messages, also provides for built-in redundant, multiple paths. As can be seen, there exist multiple paths between any gateway 120 and any compute node 140. Even if a direct connection 180-1-1 between gateway 120-1 and compute node 140-1 becomes unavailable, communication is still possible between those two elements via an alternate path, such as by traversing one of the sequencers 150 instead. Thus, more generally speaking, there exist multiple paths between any node and any other node in the mesh 172.

Furthermore, this point-to-point mesh architecture inherently supports another important goal of a financial trading system, namely, fairness. The point-to-point architecture with direct connections between nodes ensures that the path between any gateway 120 and any core compute node 140, or between the sequencer 150 and any other node has identical or, at least very similar latency. Therefore, two incoming messages sent out to the sequencer 150 at the same time from two different gateways 120 should reach the sequencer 150 substantially simultaneously. Similarly, an outgoing message being sent from a core compute node 140 is sent to all gateways 120 simultaneously, and should be received by each gateway at substantially the same time. Because the topology of the point-to-point mesh does not favor any single gateway 120, chances are minimized that being connected to a particular gateway 120 may give a participant device 130 an unfair advantage or disadvantage.

Additionally, the point-to-point mesh architecture of system 100 allows for easily reconfiguring the function of a node, that is, whether a node is currently serving as a gateway 120, core compute node 140 or sequencer 150. It is particularly easy to perform such reconfiguration in embodiments in which each node has a direct connection between itself and each other node in the point-to-point mesh. When each node is connected via a direct connection to each other node in the mesh, no re-wiring or re-cabling of connections 180 (whether physical or virtual) within the point-to-point mesh 172 is required in order to change the function of a node in the mesh (for example, changing the function of a node from a core compute node 140 to a gateway 120, or from a gateway 120 to a sequencer 150). In such embodiments, the reconfiguration required that is internal to the mesh 172 may be easily accomplished through configuration changes that are carried out remotely. In the case of a node being reconfigured to serve as a new gateway 120 or being reconfigured from serving as a gateway 120 to another function, there may be some ancillary networking changes required that are external to the mesh 172, but the internal wiring of the mesh may remain intact.

Accordingly, in some embodiments, the reconfiguration of the function of a node may be accomplished live, even dynamically, during trading hours. For example, due to changes on characteristics of the load of electronic trading system 100 or new demand, it may be useful to reconfigure a core compute node 140-1 to instead serve as an additional gateway 120. After some possible redistribution of state or configuration to other compute nodes 140, the new gateway 120 may be available to start accepting new connections from participant devices 130.

In some embodiments, lower-speed, potentially higher latency shared connections 182 may be provided among the system components, including among the gateways 120 and/or the core compute nodes 140. These shared connections 182 may be used for maintenance, control operations, management operations, and/or similar operations that do not require very low latency communications, in contrast to messages related to trading activity carried over the dedicated connections 180 in the mesh 172. Shared connections 182, carrying non-trading traffic, may be over one or more shared networks and via one or more network switches, and nodes in the mesh may be distributed among these shared networks in different ways. For example, in some embodiments, gateways 120 may all be in a gateway-wide shared network 182-g, compute nodes 140 may be in their own respective compute node-wide shared network 182-c, and sequencers 150 may be in their own distinct sequencer-wide shared network 182-s, while in other embodiments all the nodes in the mesh may communicate over the same shared network for these non-latency sensitive operations.

Distributed computing environments such as electronic trading system 100 sometimes rely on high resolution clocks to maintain tight synchronization among various components. To that end, one or more of the nodes 120, 140, 150 might be provided with access to a clock, such as a high-resolution GPS clock 195 in some embodiments.

Figure 2:
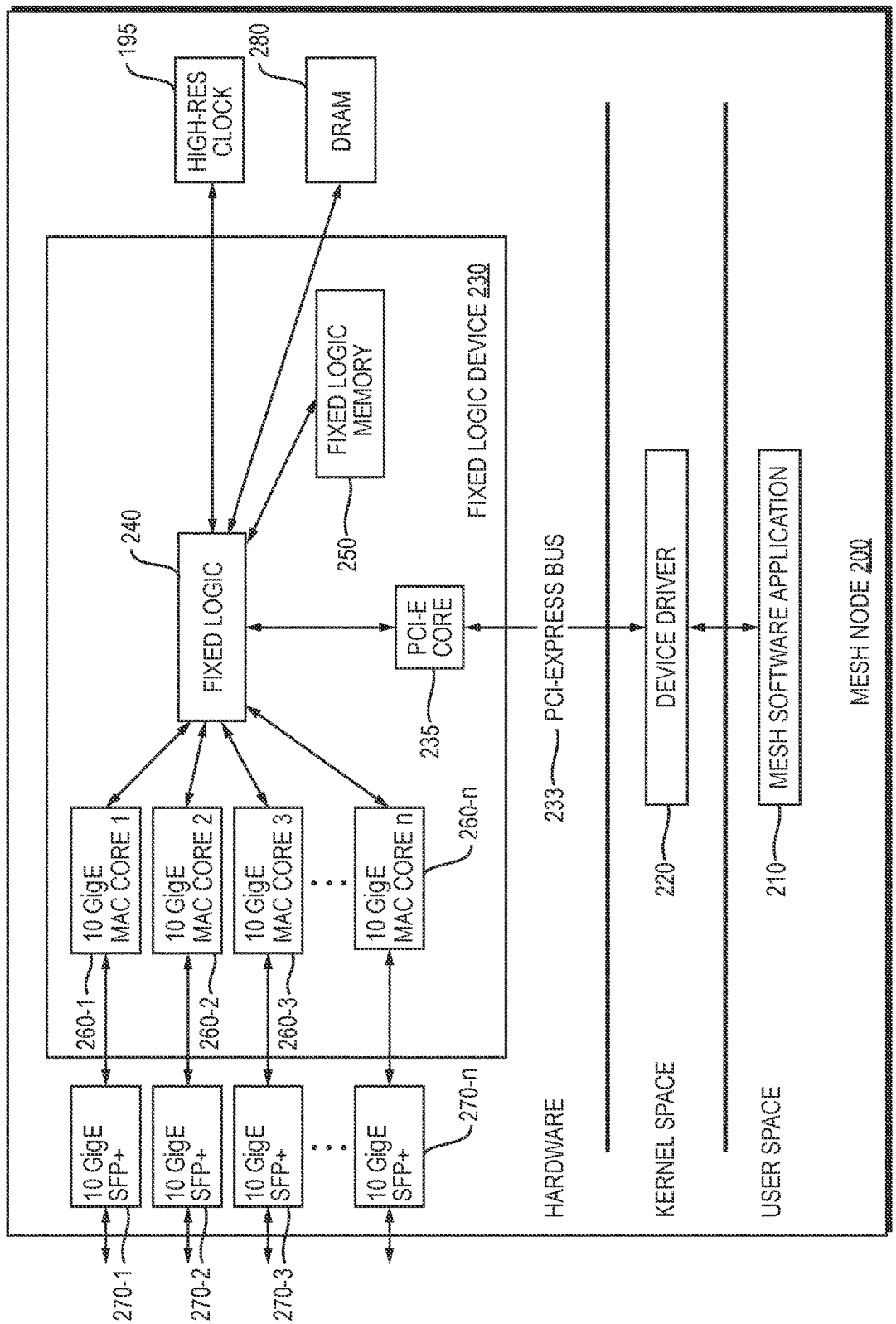
FIG. 2 is a block diagram of a compute node in an example embodiment.

For purposes of the following discussion, gateways 120, compute nodes 140, and sequencers 150 connected in the mesh 172 may be referred to as "Mesh Nodes". FIG. 2 illustrates an example embodiment of a Mesh Node 200 in the point-to-point mesh 172 architecture of electronic trading system 100. Mesh node 200 could represent a gateway 120, a sequencer 150, or a core compute node 140, for example. Although in this example, functionality in the Mesh Node 200 is distributed across both hardware and software, Mesh Node 200 may be implemented in any suitable combination of hardware and software, including pure hardware and pure software implementations, and in some embodiments, any or all of gateways 120, compute nodes 140, and/or sequencers 150 may be implemented with commercial off-the-shelf components.

In the embodiment illustrated by FIG. 2, in order to achieve low latency, some functionality is implemented in hardware in Fixed Logic Device 230, while other functionality is implemented in software in Device Driver 220 and Mesh Software Application 210. Fixed Logic Device 230 may be implemented in any suitable way, including an Application-Specific Integrated Circuit (ASIC), an embedded processor, or a Field Programmable Gate Array (FPGA). Mesh Software Application 210 and Device Driver 220 may be implemented as instructions executing on one or more programmable data processors, such as central processing units (CPUs). Different versions or configurations of Mesh Software Application 210 may be installed on Mesh Node 200 depending on its role. For example, based on whether Mesh Node 200 is acting as a gateway 120, sequencer 150, or core compute node 140, a different version or configuration of Mesh Software Application 210 may be installed.

While any suitable physical communications link layer may be employed, (including USB, Peripheral Component Interconnect (PCI)-Express, High Definition Multimedia Interface (HDMI), 10 Gigabit Ethernet (GigE), 25 GigE, 40 GigE, 100 GigE, or InfiniBand (TB), over fiber or copper cables), in this example, Mesh Node 200 has multiple low latency 10 Gigabit Ethernet SFP+ connectors (interfaces) 270-1, 270-2, 270-3, . . . , 270-n, (known collectively as connectors 270). Connectors 270 may be directly connected to other nodes in the point-to-point mesh via dedicated connections 180, connected via shared connections 182, and/or connected to participant devices 130 via a gateway 120, for example. These connectors 270 are electronically coupled in this example to 10 GigE MAC Cores 260-1, 260-2, 260-3, . . . , 260-n, (known collectively as GigE Cores 260), respectively, which in this embodiment are implemented by Fixed Logic Device 230 to ensure minimal latency. In other embodiments, 10 GigE MAC Cores 260 may be implemented by functionality outside Fixed Logic Device 230, for example, in PCI-E network interface card adapters.

In some embodiments, Fixed Logic Device 230 may also include other components. In the example of FIG. 2, Fixed Logic Device 230 also includes a Fixed Logic 240 component. In some embodiments, fixed Logic component 240 may implement different functionality depending on the role of Mesh Node 200, for example, whether it is a gateway 120, sequencer 150, or core compute node 140. Also included in Fixed Logic Device 230 is Fixed Logic Memory 250, which may be a memory that is accessed with minimal latency by Fixed Logic 240. Fixed Logic Device 230 also includes a PCI-E Core 235, which may implement PCI Express functionality. In this example, PCI Express is used as a conduit mechanism to transfer data between hardware and software, or more specifically, between Fixed Logic Device 240 and the Mesh Software Application 210, via Device Driver 220 over PCI Express Bus 233. However, any suitable data transfer mechanism between hardware and software may be employed, including Direct Memory Access (DMA), shared memory buffers, or memory mapping.

In some embodiments, Mesh Node 200 may also include other hardware components. For example, depending on its role in the electronic trading system 100, Mesh Node 200 in some embodiments may also include High-Resolution Clock 195 (also illustrated in and discussed in conjunction with FIG. 1) used in the implementation of high-resolution clock synchronization among nodes in electronic trading system 100. A Dynamic Random-Access Memory (DRAM) 280 may also be included in Mesh Node 200 as an additional memory in conjunction with Fixed Logic Memory 250. DRAM 280 may be any suitable volatile or non-volatile memory, including one or more random-access memory banks, hard disk(s), and solid-state disk(s), and accessed over any suitable memory or storage interface.

FIGS. 3A-E illustrate a distributed system 300 in which example embodiments may be implemented. The distributed system 300 may include some or all features of the electronic trading system 100 described above with reference to FIGS. 1 and 2. In particular, the distributed system 300 may include participant devices 330 (also referred to as client devices), gateways 320, and compute nodes 340-1, 340-2 . . . 340-6 (collectively, the compute nodes 340), which may incorporate some or all features of the participant devices 130, the gateways 120, and the compute nodes 140, respectively. Each of the participant devices 330, gateways 320, and compute nodes 340 may also incorporate some or all features of the mesh node 200 described above with reference to FIG. 2.

The distributed system 300 may process messages (e.g., trade orders) from and provide related information to the participant computing devices 330. Participant devices 330 may be one or more personal computers, tablets, smartphones, servers, or other data processing devices configured to display and receive information related to the messages (e.g., trade order information). Each participant device 330 may exchange messages with the distributed system 300 via distributed system connections established with the gateways 320. The compute nodes 340 may process the messages and generate a response. For example, if configured as a matching engine as described above, the compute nodes 340 may provide the aforementioned matching functions and may also generate outgoing messages to be delivered to one or more of the participant devices 330.

Figure 3A:
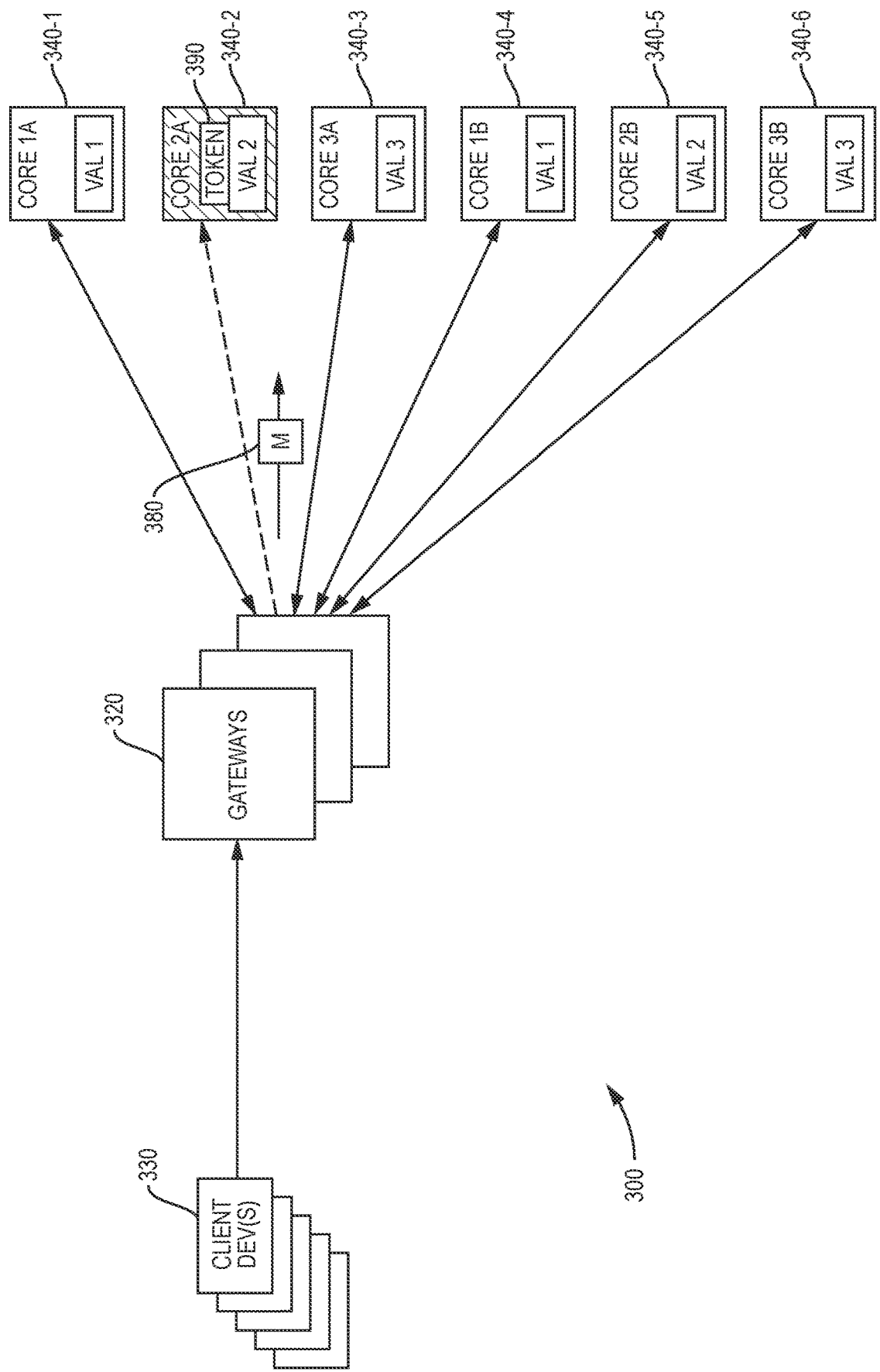
FIGS. 3A-E are block diagrams illustrating a distributed system comprising a plurality of compute nodes in one embodiment.
Figure 3B:
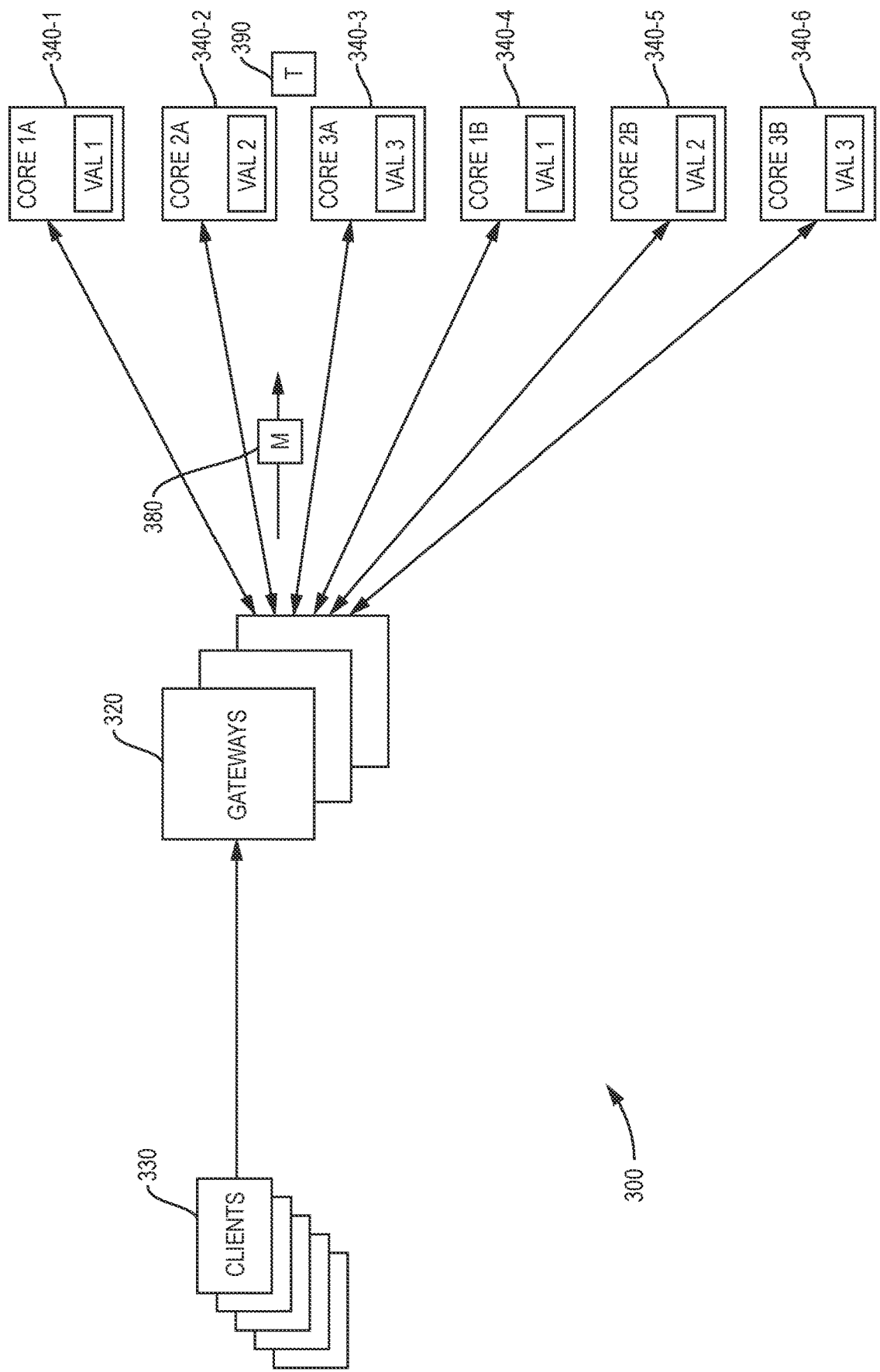

As shown in FIG. 3A, the gateways 320 transmit a message 380 from one of the participant devices 330 to the compute nodes 340. The message 380 may specify a given value of a common parameter of the messages. For example, if the messages are associated with transactions of financial instruments, the values of the common parameter may each correspond to a respective financial instrument (e.g., a stock symbol or other indicator representing a particular stock or bond), or may correspond to a type of transaction (e.g., buy, sell) that is ordered by the message 380. The compute nodes 340 may each be assigned to one or more of the values such that the assigned compute nodes are configured to process messages corresponding to the assigned common parameter values. For example, as shown in FIG. 3A, compute nodes 340-1 and 340-4 are assigned to value 1, compute nodes 340-2 and 340-5 are assigned to value 2, and compute nodes 340-3 and 340-6 are assigned to value 3. Thus, the compute nodes 320 may be divided into multiple subsets or groups, wherein each subset is configured to process messages corresponding to a respective value of the common parameter of the messages, and may refrain from processing messages that do not correspond to the respective value. Further, each compute node within a given subset may process a given message in parallel and independent from one another. Upon completing processing of a message, the compute nodes 340 may forward a response to the gateways 320, which in turn, may forward the response or information about the response to the participant computing device(s) 330 originating the message. For example, the compute nodes may generate a response informing a successful match between a buy order and a sell order, thereby indicating a completed trade of a financial instrument.

The gateways 320 may broadcast the message 380 to all of the compute nodes 340, and each of the compute nodes 340, in turn, may selectively process messages based on their common parameter value. For example, compute node 340-1 may evaluate received messages for their common parameter value, and then process only the subset of those messages that correspond to value 1. Alternatively, the gateways 320 may transmit the message 380 to a subset of the compute nodes 340 that are assigned to the value corresponding to the message 380. For example, the gateways 320 may determine that the message 380 has a common parameter value of value 1, and, accordingly, send the message to compute node 340-1 and 340-4. To do so, the gateways 320 or another node or element may maintain an index of values and compute nodes that are assigned to those values.

Periodically, the compute nodes 340 may require a self-maintenance operation to maintain optimal operation when processing messages. For example, a compute node 340-1 may require adjustment or updates to the layout of an order book stored to its internal memory, or may need to update a hash collision bucket. Alternatively, some or all of the compute nodes 340 may be reassigned to different values, thereby re-balancing the distribution of the values among the compute nodes to improve efficiency and latency in processing the messages.

During a self-maintenance operation, one or more of the compute nodes 340 may not be available to process messages. Accordingly, the distributed system 300 is configured to ensure that all messages received from the participant computing devices 330 are processed in a timely manner, and that a self-maintenance operation by one or more of the compute nodes 340 does not disrupt the processing of messages or result in an increase in latency within the distributed system. In one example, the distributed system 300 may circulate a token 390 among the compute nodes 340, and each of the compute nodes may receive the token 390 from a preceding compute node in a sequence of the compute nodes 340, possess the token 390 during an operation or a given period of time, and then pass the token 390 to a subsequent compute node. As shown in FIG. 3A, the compute node 340-2 is currently in possession of the token 390. During this state of possession of the token 390, the compute node 340-2 may perform one or more self-maintenance operations such as those described above. During the self-maintenance operation, the compute node 340-2 may be unavailable to process messages. However, because the compute node 340-5 is also configured to process messages corresponding to value 2, those messages may continue to be processed without delay.

To ensure redundant processing, the compute node 340-2 may maintain a queue of messages (e.g., at Fixed Logic Memory 250 or DRAM 280) that it receives during the self-maintenance operation. After the maintenance operation is done but before the compute node 340-2 may relinquish the token 390, the compute node 340-2 may be configured to process all messages in the queue and update its state. Newly-received messages may continue to be queued while the queue is non-empty. Once the queue is empty, the compute node 340-2 may then pass the token 390 to a subsequent compute node. In an alternative configuration to ensure redundant processing, one or more of the compute nodes 340 may be temporarily assigned to process messages corresponding to the value of the compute node that is currently undergoing a self-maintenance operation. For example, during the self-maintenance operation by the compute node 340-2, the compute node 340-1 may be temporarily assigned to process messages corresponding to value 2 in addition to messages corresponding to value 1. Alternatively, one or more of the compute nodes 340 may be dedicated to processing messages corresponding to the value of a compute node currently undergoing self-maintenance, and optionally may refrain from processing messages when a self-maintenance operation is not occurring at any of the other compute nodes 340.

Figure 3C:
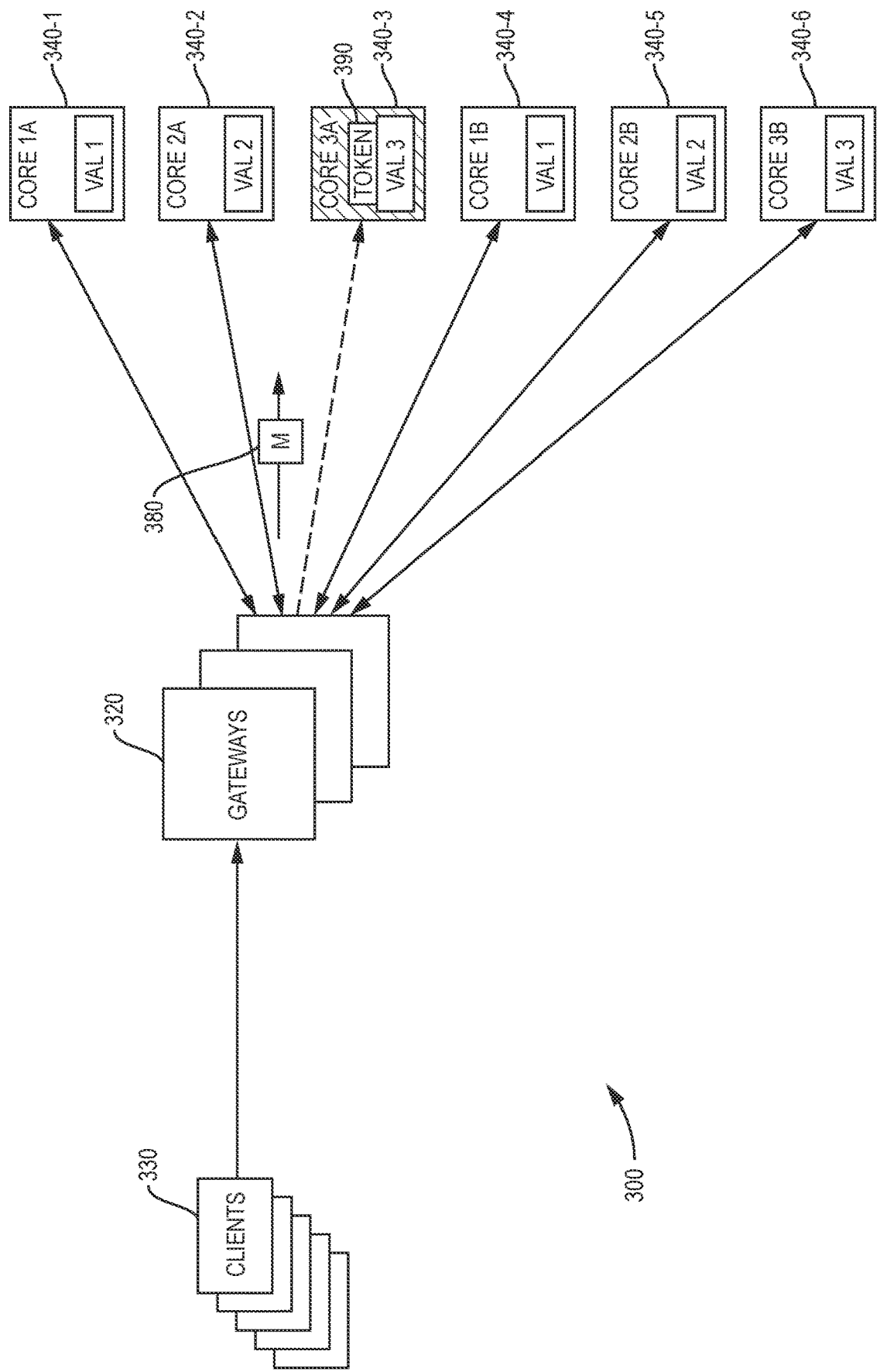
Figure 3D:
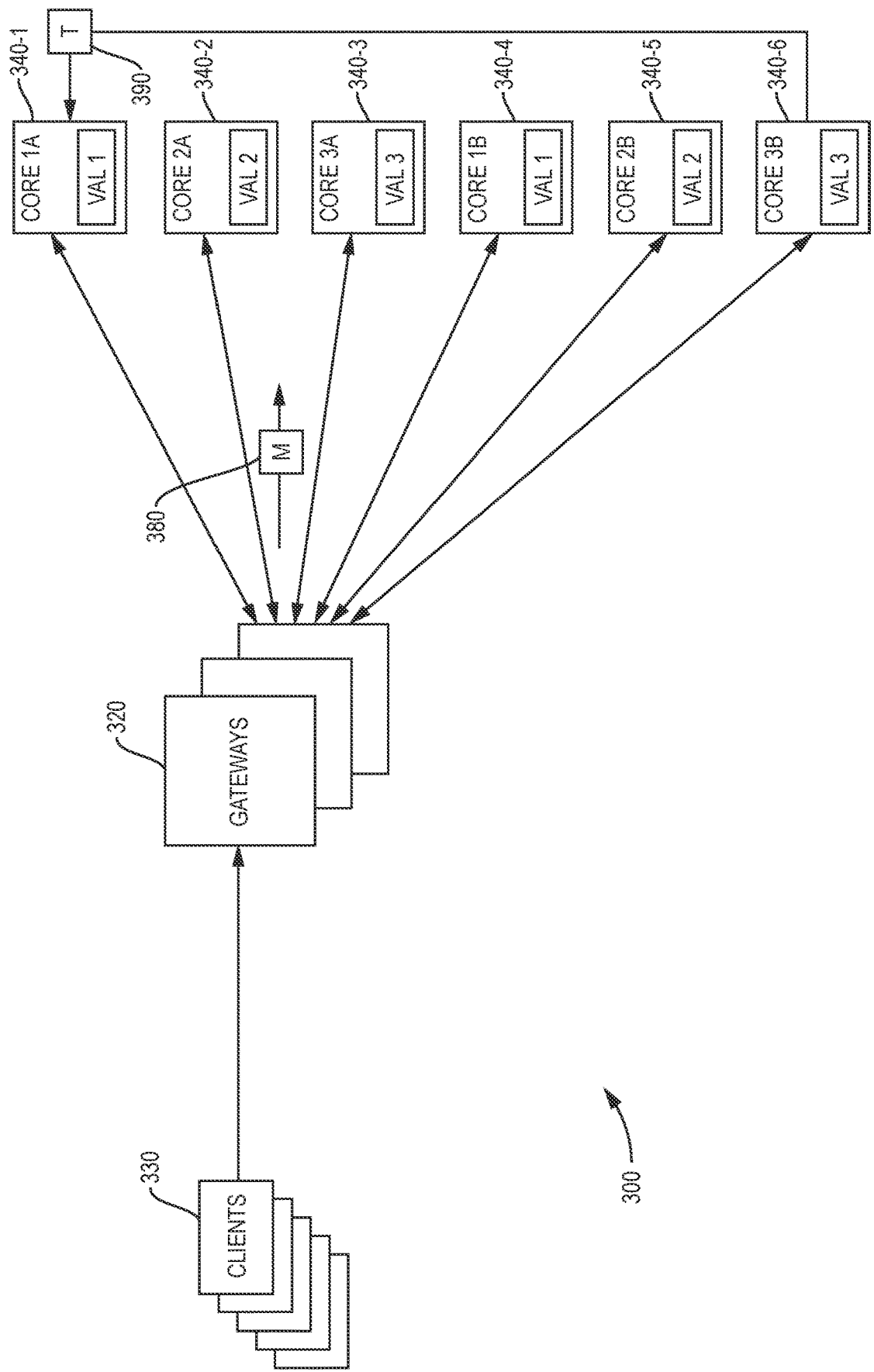
Figure 3E:
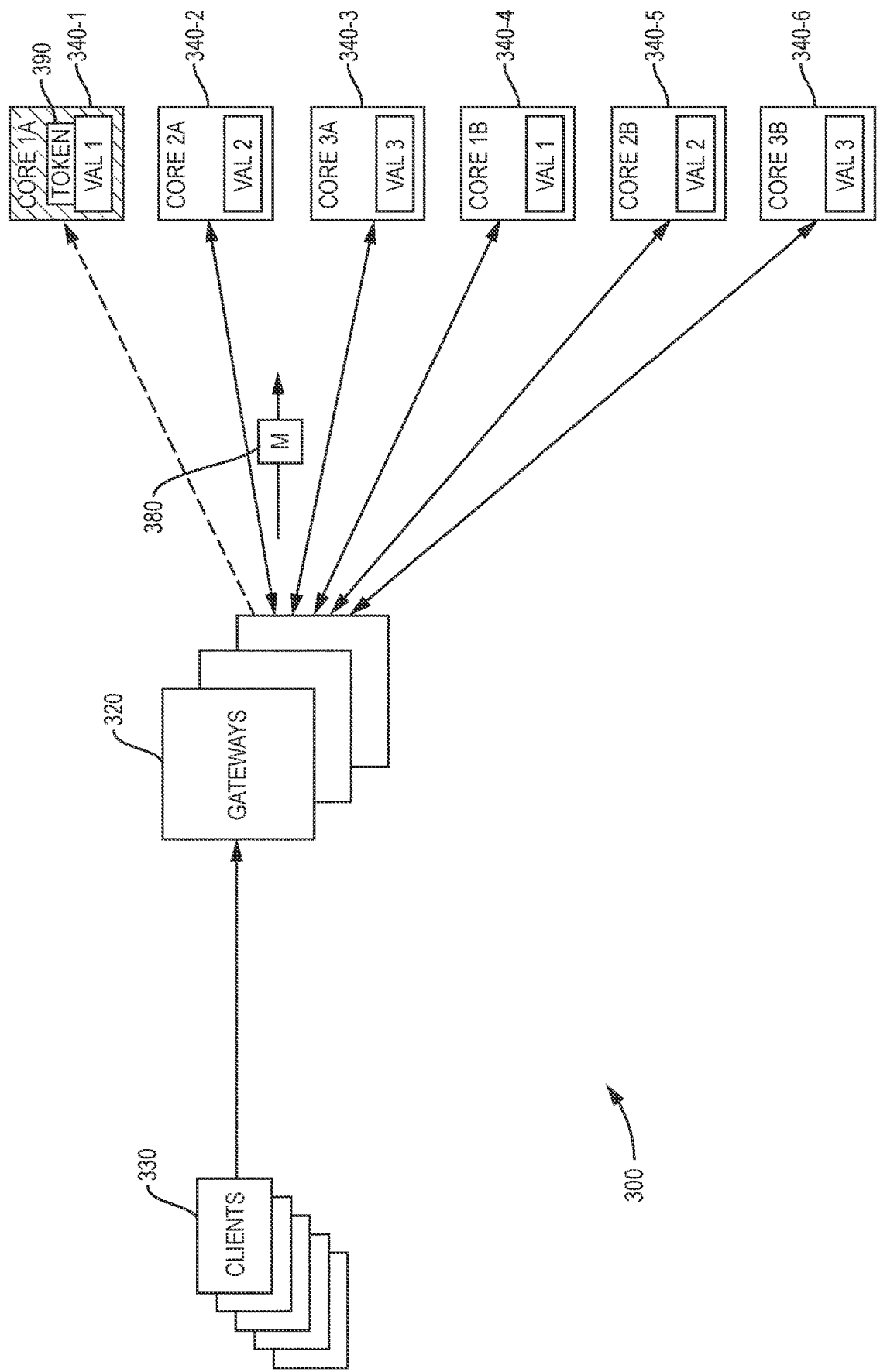

FIGS. 3B-3E illustrate circulation of the token 390 among the compute nodes 340. As shown first in FIG. 3B, the compute node 340-2, upon completing a self-maintenance operation or determining that a self-maintenance operation is not needed, may pass the token 390 to the compute node 340-3. Turning to FIG. 3C, the compute node 340-3, once in possession of the token 390, may perform a self-maintenance operation as described above. During this time, the compute node 340-6 may continue to process messages corresponding to value 3, and those messages may also be queued at the compute node 340-3. As shown in FIG. 3D, after the final node in a circulation sequence, compute node 340-6, completes a self-maintenance operation, it may pass the token 390 to the first compute node 340-1 in the sequence. Then, as shown in FIG. 3E, the compute node 340-1, once in possession of the token 390, may perform a self-maintenance operation as described above. During this time, the compute node 340-4 may continue to process messages corresponding to value 1, and those messages may also be queued at the compute node 340-3. In further embodiments, the token 390, and/or one or more additional tokens (not shown), may be circulated among the gateways 320 and/or sequencers 150 (FIG. 1) in a comparable manner, thereby enabling the gateways 320 and/or sequencers 150 to perform maintenance operations without disrupting or substantially delaying the operations performed by those nodes.

In further embodiments, the distributed system 300 may implement alternative features in place of the token to grant permission to the compute nodes 340 to perform a maintenance operation. For example, each of the compute nodes 340 may be assigned a respective time interval during which it is granted permission to perform a maintenance operation. Each time interval may be distributed among the compute nodes 340 such that the compute nodes 340 perform a respective maintenance operation in a sequence comparable to that enabled by the token 390. Alternatively, each of the compute nodes 340 may be configured to communicate with a central coordinating authority (e.g., a gateway or sequencer) for permission to perform a maintenance operation periodically or in response to a determination that maintenance is required. The central coordinating authority may have access to the maintenance states of all of the compute nodes 440, and, based on these maintenance states, may grant or deny permission to a requesting node to ensure that at least one or more nodes assigned to a given value remains operational.

Figure 4A:
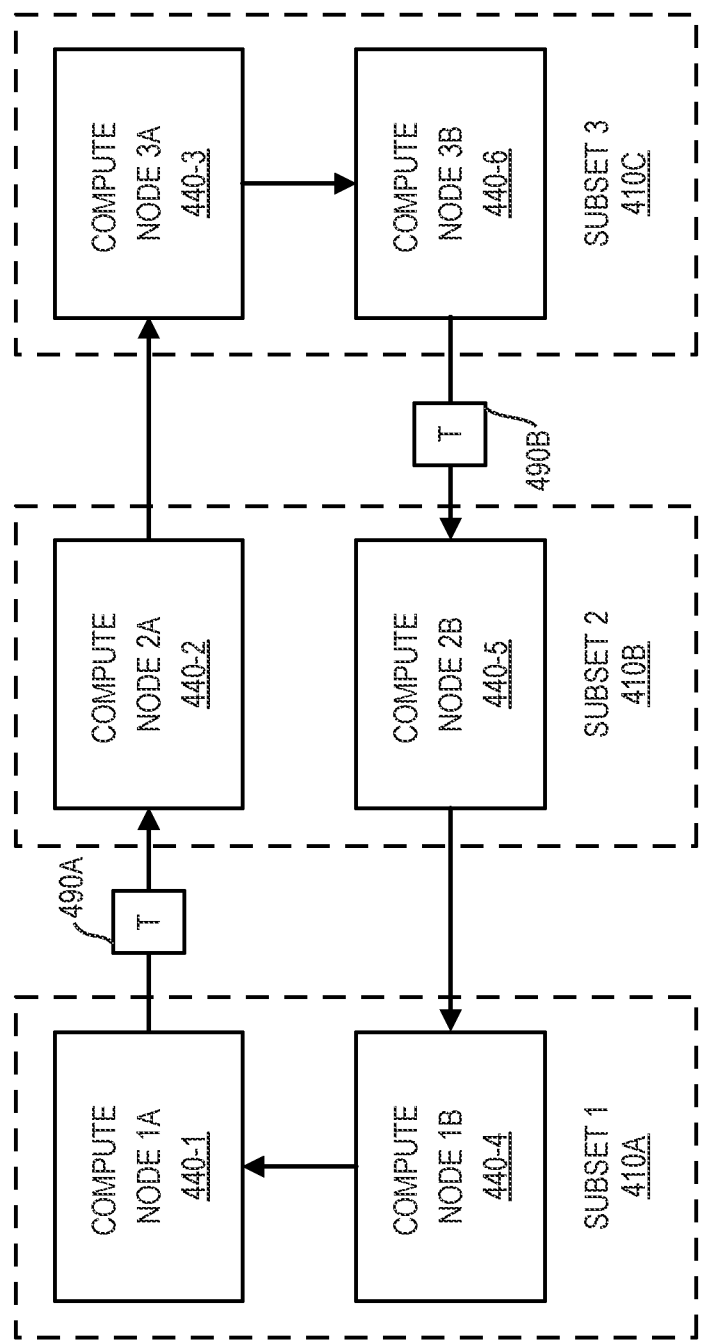
FIGS. 4A-B are block diagrams illustrating plural subsets of compute nodes in further embodiments.
Figure 4B:
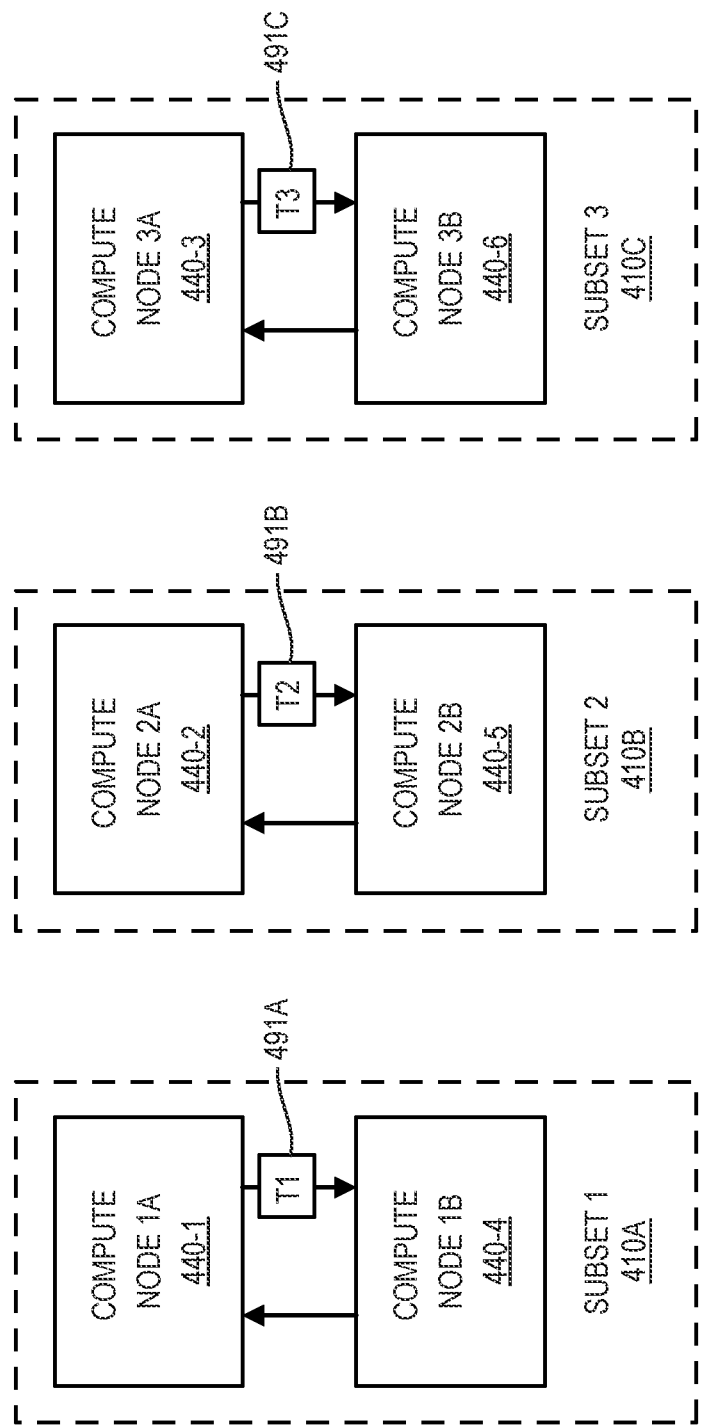

FIGS. 4A-B illustrate plural subsets of compute nodes in further embodiments, which may be implemented in the distributed system 300 described above. As shown in FIG. 4A, compute nodes 440-1, 440-2 ... 440-6 (collectively, the compute nodes 440) are divided into three subsets of compute nodes, subsets 410A-C. Each subset 410A-C may be assigned to one or more values of the common parameter of the messages such that the compute nodes within a given subset are configured to process messages corresponding to the assigned value(s).

In a distributed computing environment comprising several compute nodes, it may be advantageous to circulate multiple tokens to ensure that each compute node is given the opportunity to perform self-maintenance within an optimal timeframe. Thus, in contrast to the configuration shown in FIGS. 3A-E, the compute nodes 440 circulate a plurality of tokens 490A-B in a looping path among the nodes 440, wherein each of the compute nodes 440 may pass the token to another node within the same subset of nodes or a different subset of nodes. The tokens 490A-B may be positioned relative to one another along the path such that multiple compute nodes within the same subset (e.g., compute nodes 440-1 and 440-4 within subset 410A) do not perform maintenance simultaneously. In order to maintain such a relative position among the tokens 490A-B, the compute nodes 440 may be configured to enforce a minimum distance along the path between the tokens 490A-B. For example, the compute nodes 440 may receive a token from a preceding compute node in the path only after confirming that a subsequent compute node in the path is not in possession of another token. Further, compute nodes within the same subset may communicate with one another prior to performing a maintenance operation to confirm at least one other node within the subset is available (e.g., not undergoing maintenance or exhibiting a fault) to process messages assigned to the subset.

The tokens 490A-B may also be distinct from one another, for example by granting permission to perform different types of maintenance operations. For example, token 490A may grant permission to a compute node to adjust or update the layout of an order book stored to the node's internal memory, and token 490B may grant permission to a compute node to update a hash collision bucket. Additionally, in some embodiments, particular maintenance operations may require possession of multiple different tokens. For example, if a particular type of maintenance operation requires updating both the layout of an order book and updating a hash collision bucket, then performing that maintenance operation in a compute node may require simultaneous possession by the compute node of tokens 490A and 490B.

The compute nodes 440 may also circulate additional tokens (not shown), which may grant permission for a maintenance or another operation. For example, some or all of the compute nodes 440 may be reassigned to process messages having different values, thereby re-balancing the distribution of the values among the compute nodes to improve efficiency and latency in processing the messages. Such a reassignment may be triggered by a determination that one or more nodes are not operational (e.g., exhibiting a fault or self-maintenance operation), and may provide for one or mode compute nodes being assigned to a greater number of values than prior to the reassignment. For example, compute node 440-4 or a gateway may detect that compute node 440-1 is not operational, and, in response, may pass a token to compute node 440-5 to reassign the compute node 440-5 to process messages corresponding to values assigned to subset 410A in addition to subset 410B.

Alternatively, in response to detecting a high volume of messages corresponding to a given value, the gateway or a compute node may cause a token to be circulated (e.g., among one or more subsets) that reassigns a number of compute nodes to process messages corresponding to that value. It may be advantageous to perform such a reassignment operation using multiple tokens as described above, thereby completing the reassignment more quickly in response to the change in demands on the distributed system.

In a further embodiment, each of the tokens 490A-B may be circulated among the compute nodes 440 as shown in FIG. 4A, but may be associated with a maintenance, reassignment or other operation for a subset of the compute nodes 440. For example, token 490A may be configured to enable the compute nodes 440-1, 440-4 of subset 410A to perform a maintenance operation when in possession of the token 490A, while the compute nodes of subsets 410B-C are configured to pass the token 490A without performing a maintenance operation. The compute nodes of subsets 410B-C may instead perform a maintenance operation when in possession of token 490B. Alternatively, a single token, such as token 490A, may grant permission to perform different operations (e.g., maintenance, reassignment) based on the compute node that is in possession of it.

In further embodiments, the compute nodes 440 may perform a maintenance, reassignment or other operation based on a state of possession of a token. For example, the compute nodes 440 may circulate several tokens that, when possessed by a compute node, prohibit the node from performing the maintenance or other operation. As a result, the compute node 440-1 may perform a maintenance or other operation when it is not in possession of a token. Further, the compute nodes 440 may be configured to perform a maintenance or other operation based on whether another node, such as a node within the same subset, possesses a token. For example, compute node 440-1 may be configured to perform a maintenance operation only when compute node 440-4 does or does not possess a token, thereby ensuring that at least one node of the subset 410A remains operational at all times.

FIG. 4B illustrates the compute nodes 440 in a configuration comparable to that of FIG. 4A, with the exception that each subset of nodes 410A-C circulates a respective token 491A-C within the subset. For example, in subset 410A, compute nodes 440-1 and 440-4 periodically pass the token 491A between them, performing a self-maintenance operation when in possession of the token 491A. For a subset having several compute nodes, or compute nodes that require frequent maintenance, such a configuration may be advantageous to ensure that each compute node has the opportunity to perform self-maintenance within an optimal timeframe, while also ensuring that at least one node of the subset is available to process messages. In further embodiments, the compute nodes 440 may implement a combination of the token configurations shown in FIGS. 4A and 4B, passing tokens within and among the subsets of nodes 410A-C.

Figure 5:
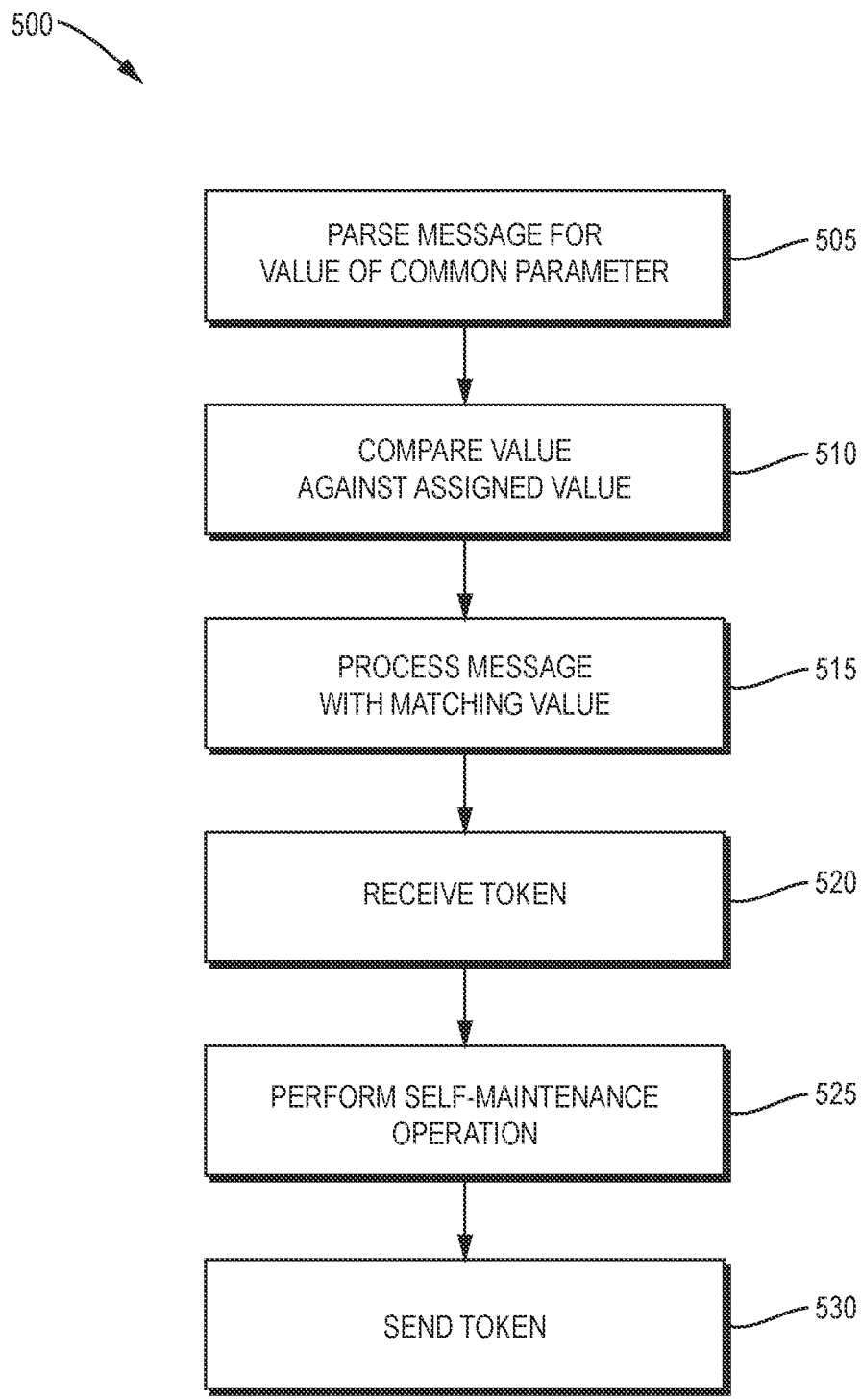
FIG. 5 is a flow diagram illustrating operation of a compute node in one embodiment.

FIG. 5 illustrates a process 500 comprising several steps that may be performed by a compute node such as the compute nodes 340, 440 describe above. With reference to FIG. 3A, upon receiving a message 380, a compute node 340-1 may parse the message 380 to determine the value of the common parameter of the message (step 505), and compare that value against the one or more values assigned to it (510). If the compute node 340-1 determines a match between the assigned value and the value of the message, the compute node 340-1 may then process the message 380 and forward a reply (e.g., information about the result of the processing) to the gateways 320 or another element (515). Alternatively, if the gateways 320 are configured to perform a sorting function on received messages and forward messages only to compute nodes assigned to process those messages, then the compute node 340-1 may refrain from determining the match.

Upon receiving a token 390 from a preceding compute node (e.g., node 340-6) (520), the compute node 340-1 may determine whether to perform a self-maintenance operation. The compute node 340-1 may make this determination based on a period of time since a previous maintenance operation, a state of the node's internal memory or other stored data, and/or a given type of maintenance operation that may be specified by the token 390. If the compute node 340-1 determines that a self-maintenance operation is appropriate, then the compute node 340-1 performs the self-maintenance operation (525). As described above, the compute node 340-1 may maintain a queue of messages (e.g., at memory 250) that it receives during the self-maintenance operation. After the maintenance operation is done but before the compute node 340-1 may pass the token 390, the compute node 340-1 may be configured to process all messages in the queue and update its state. Newly-received messages may continue to be queued while the queue is non-empty. Once the queue is empty, the compute node 340-1 may then pass the token 390 to a subsequent compute node (e.g., node 340-2) (530).

FIG. 6 illustrates an arrangement 600 of compute nodes in a further embodiment, which may be implemented in the distributed system 300 described above. As shown in FIG. 6, compute nodes 640-1, 640-2 . . . 640-N (collectively, the compute nodes 640) are configured to circulate a token 690 among them. Each of the compute nodes 640 may be assigned to two or more values of the common parameter of the messages such that the compute nodes 640 are configured to process messages corresponding to the assigned values. In contrast to the node subset configurations described above, values are assigned to the compute nodes 640 in a configuration that may be referred to as a "striping" configuration. Under such a configuration, each value of the common parameter may be assigned to at least two of the compute nodes 640, and each compute node 640 is assigned to a respective subset of two or more values of the common parameter. Further, each of the subsets may differ from one another by at least one value of the common parameter. As a result of such a configuration, if one compute node is undergoing maintenance or is otherwise unavailable, two or more other compute nodes may be available to process messages assigned to that node. For example, compute node 640-2 is assigned to process messages corresponding to values 2 and 3. When the compute node 640-2 is in possession of the token 690 and performing a self-maintenance operation, compute node 640-1 may continue to process messages corresponding to value 2, and compute node 640-3 may continue to process messages corresponding to value 3. After completing the self-maintenance operation, the compute node 640-2 may then pass the token to compute node 640-3 and resume processing messages corresponding to values 2 and 3 while compute node 640-3 is undergoing a self-maintenance operation.

FIGS. 7A-D illustrate a distributed system 700 in a further embodiment. The distributed system 700 may include some or all features of the electronic trading system 100 and distributed system 300 described above with reference to FIGS. 1-3. In particular, the distributed system 700 may include participant devices 730 (also referred to as client devices), gateways 720, and compute nodes 740-1, 740-2, 740-3 (collectively, the compute nodes 740), which may incorporate some or all features of the participant devices 130, the gateways 120, and the compute nodes 140, respectively. Each of the participant devices 730, gateways 720, and compute nodes 740 may also incorporate some or all features of the mesh node 200 described above with reference to FIG. 2.

Figure 7A:
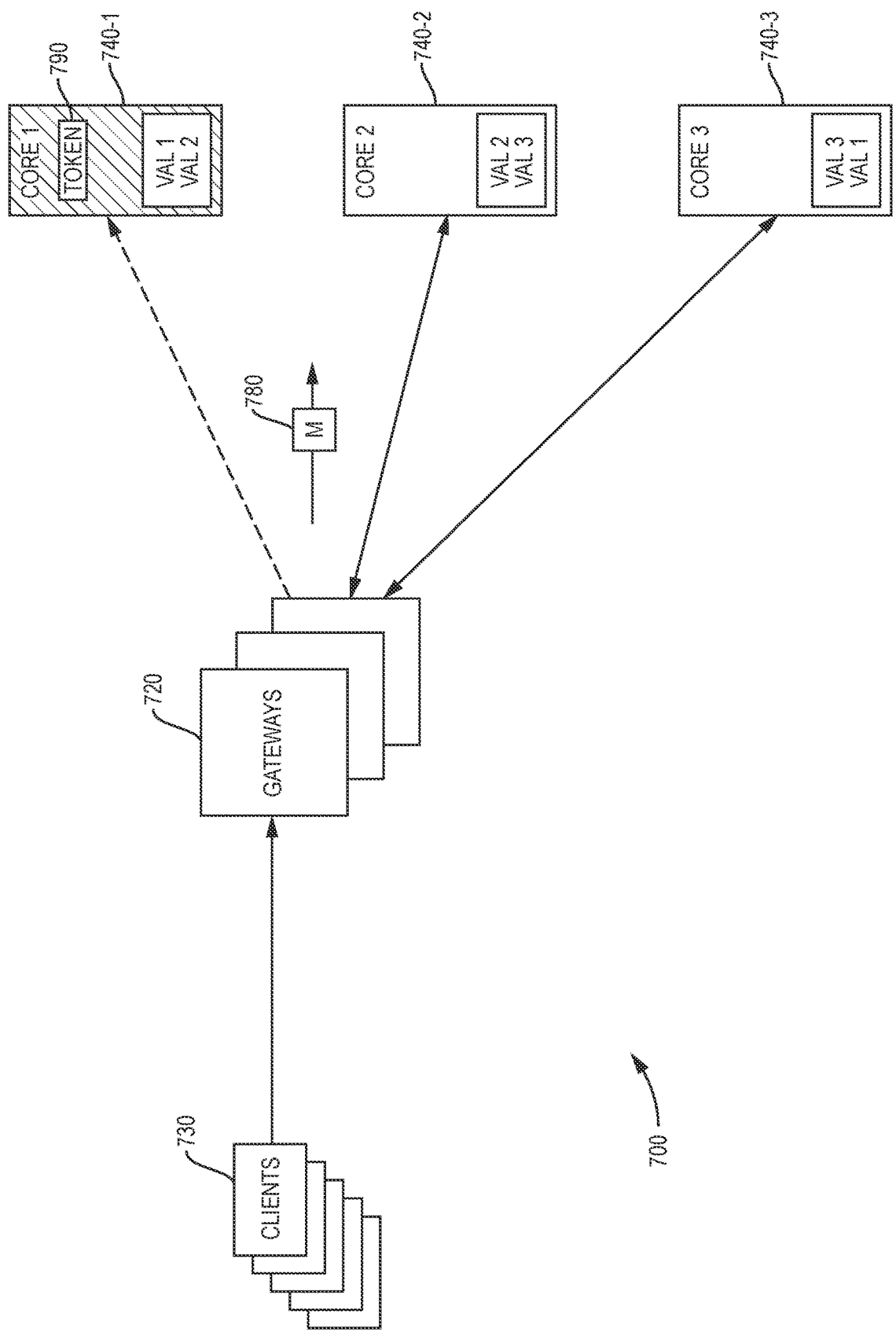
FIGS. 7A-D are block diagrams illustrating a distributed system comprising a plurality of compute nodes in a further embodiment.

As shown in FIG. 7A, the compute nodes 740 are assigned to process messages, such as message 780, corresponding to values of a common parameter in a "striping" configuration as described above with reference to FIG. 6. In particular, compute node 740-1 is assigned to process messages corresponding to values 1 and 2, compute node 740-2 is assigned to process messages corresponding to values 2 and 3, and compute node 740-3 is assigned to process messages corresponding to values 3 and 1. In FIG. 7A, compute node 740-1 is currently in possession of the token 790. During this state of possession of the token 790, the compute node 740-1 may perform one or more self-maintenance operations such as those described above. During the self-maintenance operation, the compute node 740-1 may be unavailable to process messages. However, because compute node 740-2 is also configured to process messages corresponding to value 2, and because compute node 740-3 is also configured to process messages corresponding to value 1, those messages may continue to be processed without an increased delay.

Figure 7B:
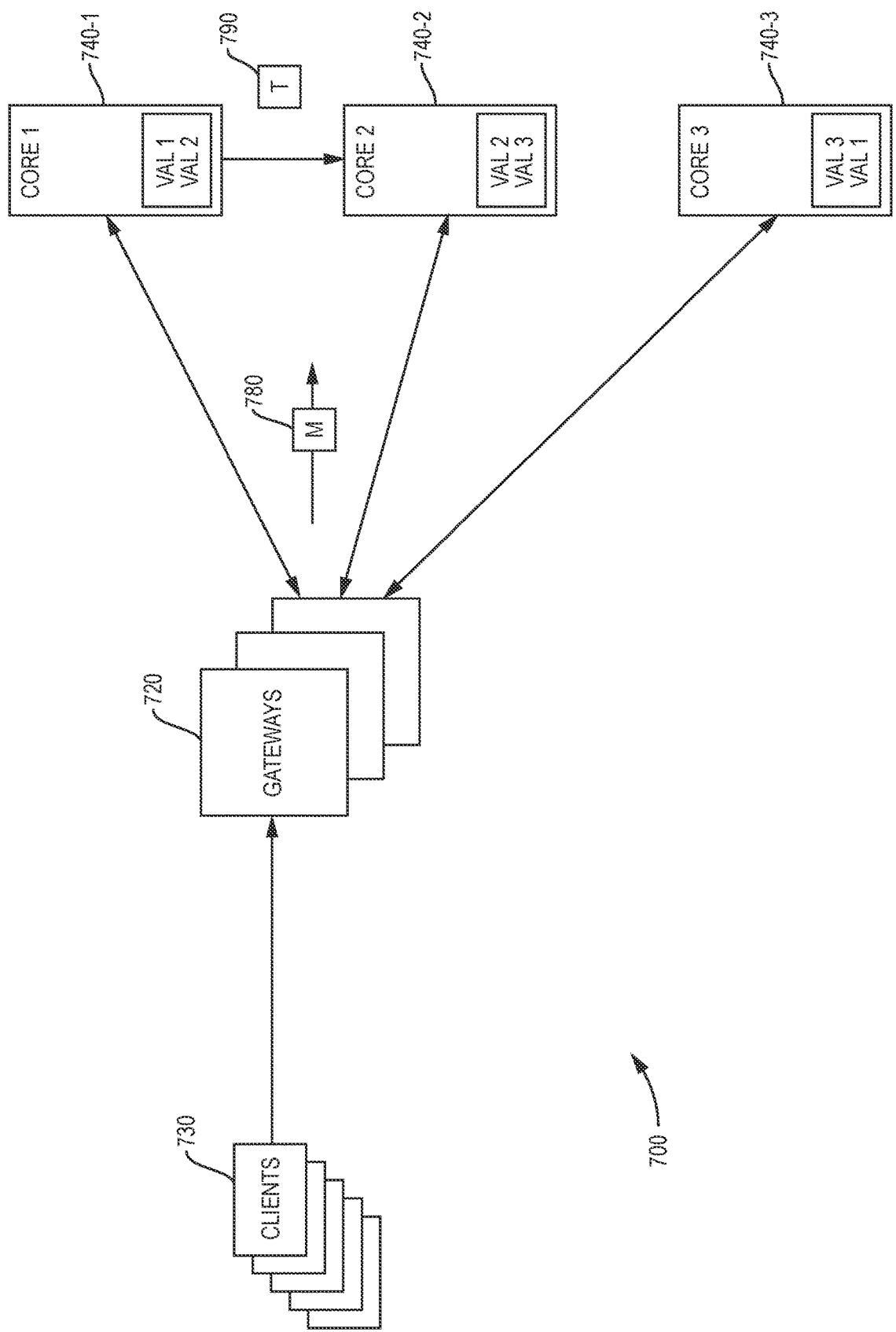
Figure 7C:
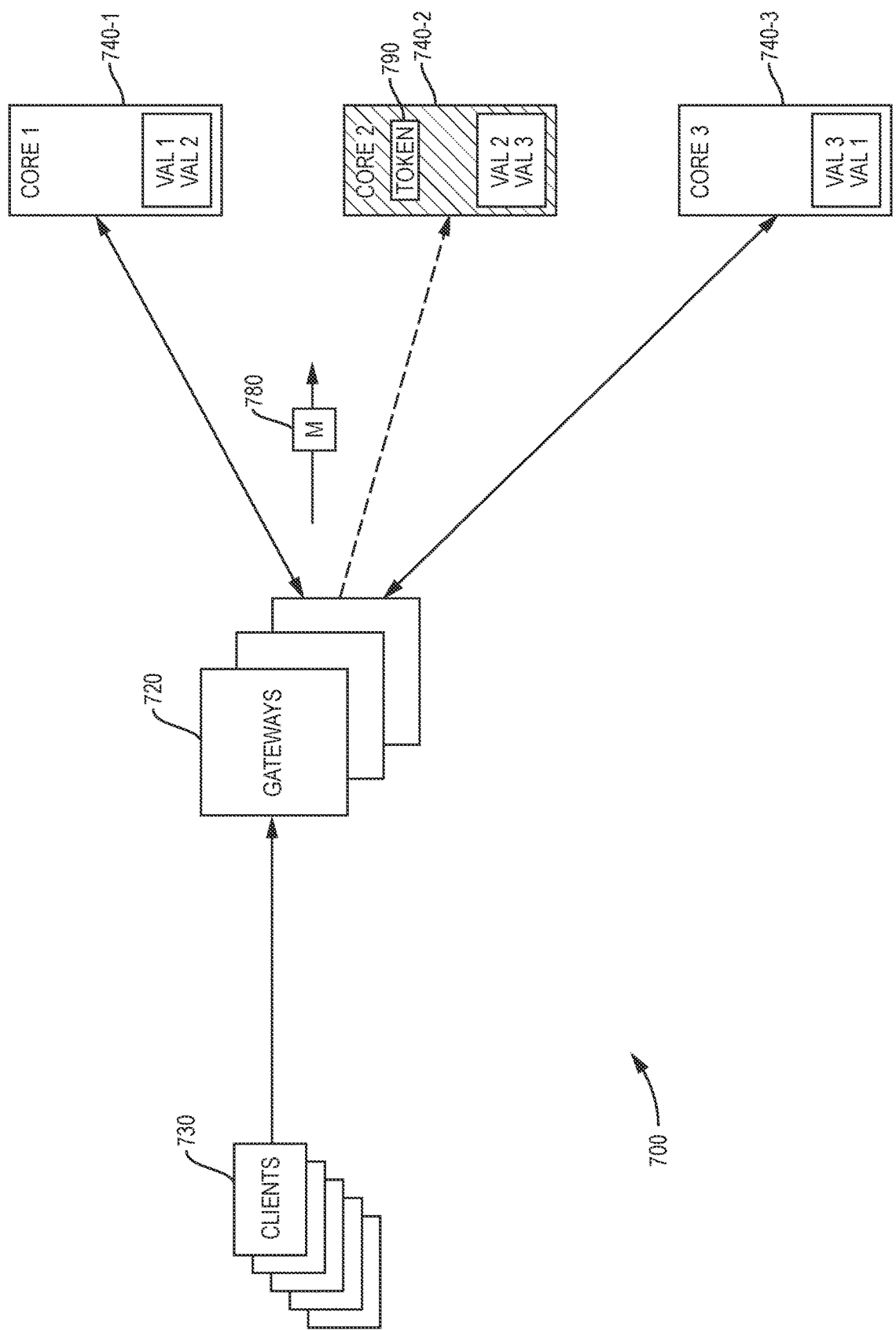
Figure 7D:
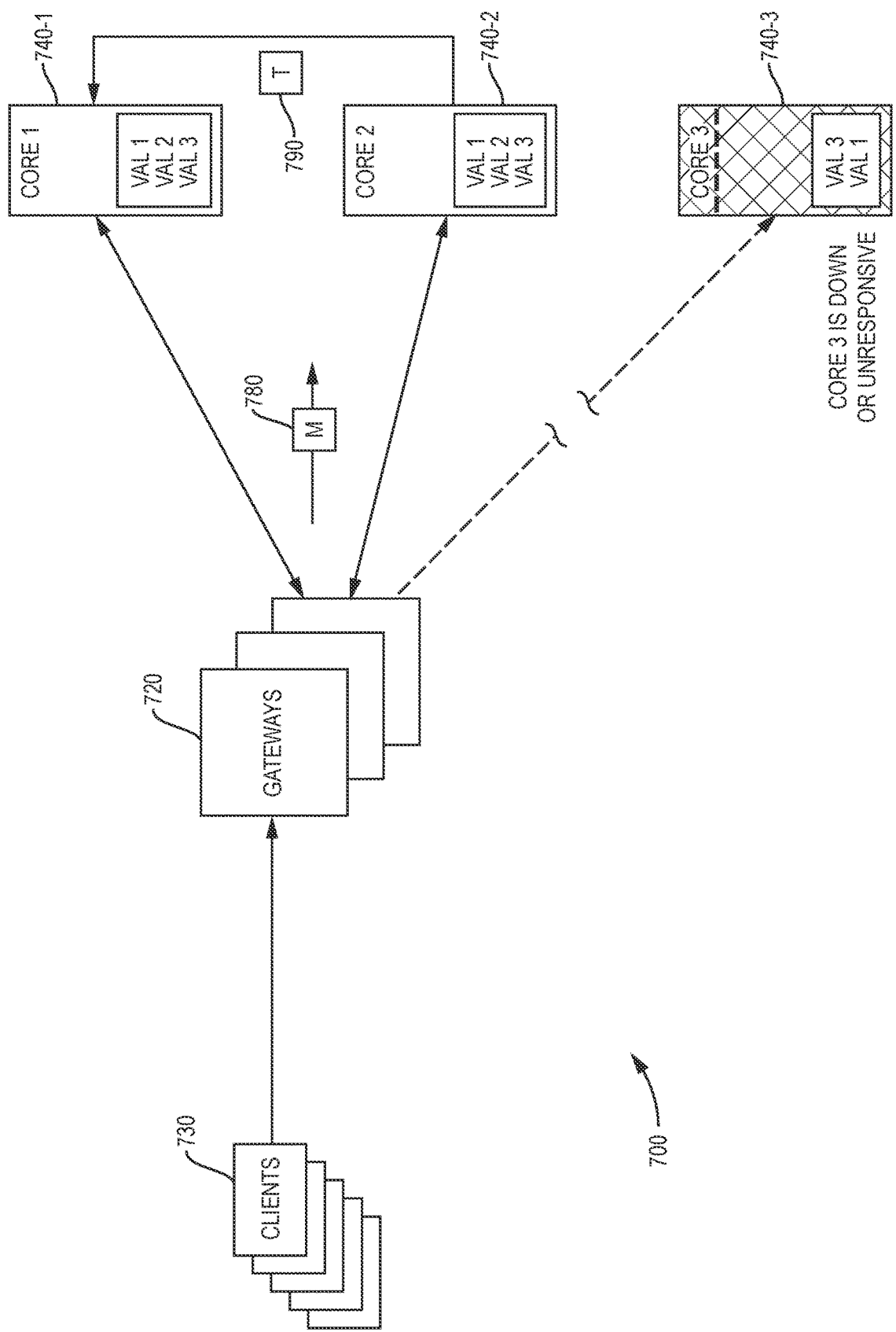

FIGS. 7B and 7D illustrate circulation of the token 790 among the compute nodes 740. As shown first in FIG. 7B, the compute node 740-1, upon completing the self-maintenance operation, may pass the token 790 to compute node 740-2. Turning to FIG. 7C, the compute node 740-2, once in possession of the token 790, may perform a self-maintenance operation as described above. During this time, compute nodes 740-1 and 740-2 may continue to process messages corresponding to values 2 and 3, respectively, and those messages may also be queued at the compute node 740-2.

FIG. 7D illustrates the network 700 during an event wherein one of the compute nodes, compute node 740-3, is exhibiting a fault or is otherwise unresponsive. Alternatively, the compute node 740-3 may be undergoing a maintenance operation. The gateways 720 may detect this state of the compute node 740-3 based on an absence of a response by the compute node 740-3, an indicator (e.g., error message) provided by the compute node 740-3, or another indication the that compute node 740-3 is unavailable to process messages. In response to this determination, the remaining compute nodes 740-1, 740-2 may be temporarily assigned to process messages corresponding to the values of compute node 740-3 in addition to the values that they are currently assigned. For example, as shown, compute node 340-1 may be temporarily assigned to process messages corresponding to value 3, and compute node 340-1 may be temporarily assigned to process messages corresponding to value 1. This reconfiguration may be initiated by an instruction from the gateways 720, sequencers 150 (see FIG. 1), or may be carried out independently by compute nodes 740-1, 740-2 in response to detecting that compute node 740-3 is down. In some embodiments, values of the common parameter assigned to compute nodes 740 may be re-distributed even when all nodes are fully operational, for example, to better balance the load throughout the compute nodes 740, due to changing conditions. During this time, the operational compute nodes (i.e., nodes 740-1, 740-2) may continue to circulate the token 790 under a modified sequence that skips compute node 740-3. After detecting that compute node 740-3 is again operational and available to process messages, the compute nodes 740 may return to the processing and circulation configurations shown in FIGS. 7A-C. In further embodiment, one or more of the compute nodes 740 may be dedicated to processing messages corresponding to the value of any compute node that is currently unavailable, and optionally may refrain from processing messages when a self-maintenance operation is not occurring at any of the other compute nodes 740.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of the components disclosed above, or equivalents thereof, firmware, custom designed semiconductor logic, Application Specific Integrated Circuits (ASICs), Field Programmable Gate Arrays (FPGAs), a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as one or more random access memor(ies) (RAMs), read only memor(ies) (ROMs), compact disk read-only memor(ies) (CD-ROMs), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

Accordingly, further embodiments may also be implemented in a variety of computer architectures, physical, virtual, cloud computers, and/or some combination thereof, and thus the data processing systems described herein are intended for purposes of illustration only and not as a limitation of the embodiments.

Therefore, while example embodiments have been particularly shown and described, it will be understood by those skilled in the art that various changes in form and details may be made therein without departing from the scope of the embodiments encompassed by the appended claims.

For example, it should now be understood that although some of the embodiments discussed and illustrated above describe the same number of values as being assigned to each compute node, in other embodiments, the subset of values assigned to each compute node may be of different and varying sizes. As but one example, referring to FIG. 6, in other embodiments, compute nodes 640-1, 640-2, 640-3, and 640-N may be assigned 4 values, 8 values, 3 values, and 7 values, respectively, to distribute the load more evenly among the compute nodes. Furthermore, a value may be assigned to more than two compute nodes. For example, each value may be assigned to three or more compute nodes, and/or, in some embodiments, some values may be assigned to more compute nodes than other values.

What is claimed is:

1. A distributed system comprising:
a plurality of compute nodes configured to process messages;
the plurality of compute nodes being configured to 1) circulate at least one token between or among at least two of the plurality of respective compute nodes, and 2) perform a self-maintenance operation during a given state of possession of the at least one token;
wherein the plurality of compute nodes further comprises:
a first subset of at least two of the plurality of compute nodes, the first subset being configured to process messages corresponding to a first value of a common parameter of the messages; and
a second subset of at least two of the plurality of compute nodes being distinct from the first subset, the second subset being configured to process messages corresponding to a second value of the common parameter of the messages and to refrain from processing messages corresponding to the first value: wherein each compute node of the plurality of compute nodes is configured to refrain from performing the self-maintenance operation when not in the given state of possession of the at least one token.

2. The distributed system of claim 1, wherein each of the compute nodes of the first subset is configured to process a message corresponding to the first value in parallel and independent from one another.

3. The distributed system of claim 1, wherein, during the self-maintenance operation by one of the compute nodes of the first subset, at least one other compute node of the first subset is configured to process a message corresponding to the first value.

4. The distributed system of claim 1, wherein the plurality of compute nodes is further configured to circulate the at least one token between or among the first and second subsets.

5. The distributed system of claim 1, wherein the first subset is configured to circulate a first one of the at least one token between or among the plurality of compute nodes of the first subset, and wherein the second subset is configured to circulate a second one of the at least one token between or among the second subset.

6. A distributed system comprising:
a plurality of compute nodes configured to process messages;
the plurality of compute nodes being configured to 1) circulate at least one token between or among at least two of the plurality of respective compute nodes, and 2) perform a self-maintenance operation during a given state of possession of the at least one token;
wherein each of a plurality of values of a common parameter of the messages is assigned to at least two of the plurality of compute nodes, the at least two of the plurality of compute nodes circulating the at least one token between or among them;
wherein each compute node of the plurality of compute nodes is configured to refrain from performing the self-maintenance operation when not in the given state of possession of the at least one token.

7. The distributed system of claim 6, wherein each of the plurality of compute nodes is assigned to process a respective subset of at least two of the plurality of values of the common parameter.

8. The distributed system of claim 7, wherein each of the respective subsets differs from one another by at least one value of the common parameter.

9. The distributed system of claim 6, wherein each of the plurality of compute nodes assigned to a given value of the common parameter is configured to process a message corresponding to the given value in parallel and independent from one another.

10. The distributed system of claim 7, wherein, during a self-maintenance operation by a first compute node assigned to a first value of the common parameter, a second compute node is assigned to process messages corresponding to the first value in addition to the respective subset.

11. The distributed system of claim 6, wherein each compute node of the plurality of compute nodes is configured to 1) receive the at least one token from a preceding one of the plurality of compute nodes; 2) perform the self-maintenance operation selectively based on a state of the compute node; and 3) forward the at least one token to a subsequent one of the plurality of compute nodes.

12. The distributed system of claim 6, wherein the messages are associated with transactions of financial instruments, respective values of the common parameter of the messages each corresponding to a respective financial instrument or a transaction type.

13. The distributed system of claim 6, further comprising:
at least one gateway configured to forward the messages to the plurality of compute nodes; and
at least one sequencer configured to sequence the messages.

14. The distributed system of claim 13, wherein the plurality of compute nodes are further configured to forward a response to the at least one gateway after processing a message.

15. The distributed system of claim 13, wherein the at least one gateway is further configured to transmit a message to a corresponding subset of the plurality of compute nodes as a function of a first value of the common parameter of the message.

16. The distributed system of claim 6, wherein the self-maintenance operation includes at least one of 1) clearing data associated with at least one previous message processing operation, 2) moving data in memory, 3) adjusting layout of a memory, and 4) modifying a message queue.

17. The distributed system of claim 6, wherein:
the at least one token includes a plurality of tokens, each of the plurality of tokens indicating a respective type of self-maintenance operation; and
the self-maintenance operation corresponds to the respective type.

18. The distributed system of claim 6, wherein the plurality of compute nodes includes:
a first compute node configured to process messages corresponding to a first value and a second value of the common parameter of the messages;
a second compute node configured to process messages corresponding to the second value and a third value of the common parameter of the messages and to refrain from processing messages corresponding to the first value; and
a third compute node configured to process messages corresponding to the third value and a fourth value of the common parameter of the messages and to refrain from processing messages corresponding to the second value.

19. The distributed system of claim 18, wherein, in response to an indication that the first compute node is not operational, at least one of the plurality of compute nodes is reconfigured to process messages corresponding to at least one of the first value and the second value.

20. A method of processing messages, comprising:
at a plurality of compute nodes, selectively processing messages based on a value of a common parameter of the messages; at the plurality of compute nodes, circulating at least one token between or among at least two of the plurality of respective compute nodes;
at the plurality of compute nodes, perform performing a self-maintenance operation during a given state of possession of the at least one token;
assigning each of the plurality of values of the common parameter to at least two of the plurality of compute nodes; assigning each of the plurality of compute nodes to process a respective subset of at least two of the plurality of values of the common parameter, wherein each of the respective subsets differs from one another by at least one value of the common parameter; and
at the plurality of compute nodes, refraining from performing the self-maintenance operation when not in the given state of possession of the at least one token.

21. A method of processing messages, comprising: at a plurality of compute nodes, selectively processing messages based on a value of a common parameter of the messages, at the plurality of compute nodes, circulating at least one token between or among at least two of the plurality of respective compute nodes, at the plurality of compute nodes, performing a self-maintenance operation during a given state of possession of the at least one token and refraining from performing the self-maintenance operation when not in the given state of possession of the at least one token; at a first subset of at least two of the plurality of compute nodes, processing messages corresponding to a first value of the common parameter of the messages; and at a second subset of at least two of the plurality of compute nodes being distinct from the first subset, processing messages corresponding to a second value of the common parameter of the messages and refraining from processing messages corresponding to the first value.

22. The method of claim 20, further comprising, at each compute node of the plurality of compute nodes:
receiving the at least one token from a preceding one of the plurality of compute nodes;
performing the self-maintenance operation selectively based on a state of the compute node; and
forwarding the at least one token to a subsequent one of the plurality of compute nodes.

23. The method of claim 20, wherein the messages are associated with transactions of financial instruments, the respective values of the common parameter each corresponding to a respective financial instrument or a transaction type.

24. The method of claim 20, wherein the self-maintenance operation includes at least one of 1) clearing data associated with at least one previous message processing operation, 2) moving data in memory, 3) adjusting layout of a memory, and 4) modifying a message queue.

25. A method of processing messages, comprising:
at a first compute node: parsing a first message to determine a value of a common parameter of the message; selectively processing the message based on whether the value corresponds to an assigned common parameter associated with the first compute node; receiving a token from a second compute node; performing a self-maintenance operation during a given state of possession of the token and refraining from performing the self-maintenance operation when not in the given state of possession of the token; and sending the token to the second compute node or a third compute node; assigning each of a plurality of values of the common parameter to at least two of a plurality of compute nodes including the first, second and third compute nodes; and assigning each of the plurality of compute nodes to process a respective subset of at least two of the plurality of values of the common parameter, wherein each of the respective subsets differs from one another by at least one value of the common parameter.

26. The method of claim 25, wherein the messages are associated with transactions of financial instruments, the respective values of the common parameter each corresponding to a respective financial instrument or a transaction type.

\* \* \* \* \*

UNITED STATES PATENT AND TRADEMARK OFFICE
CERTIFICATE OF CORRECTION

PATENT NO. : 11,683,199 B2
APPLICATION NO. : 16/988464
DATED : June 20, 2023
INVENTOR(S) : Anthony D. Amicangioli, Allen Bast and Christophe Juhasz It is certified that error appears in the above-identified patent and that said Letters Patent is hereby corrected as shown below:

In the Claims

In Column 22, Claim 1, Line 23, delete ":" after "value" and insert --;--.

In Column 22, Claim 6, Line 49, insert --and-- after "messages;".

In Column 22, Claim 6, Line 59, insert --and-- after "them;".

In Column 24, Claim 20, Line 10, delete "perform" before "performing a".

In Column 24, Claim 21, Line 25, delete "," after "messages" and insert --;--.

In Column 24, Claim 21, Line 28, delete "," after "nodes" and insert --;--.

In Column 25, Claim 26, Line 14, delete "respective" and insert --plurality of--.

Signed and Sealed this
Second Day of January, 2024

Katherine Kelly Vidal
*Director of the United States Patent and Trademark Office*